US012605875B2

(12) United States Patent
Maehara et al.

(10) Patent No.: US 12,605,875 B2
(45) Date of Patent: Apr. 21, 2026

(54) METHOD FOR PRODUCING POLYMERIC MOLDED PRODUCT COMPRISING PRETREATMENT BY HEATING

(71) Applicants: Mitsubishi Gas Chemical Company, Inc., Chiyoda-ku (JP); The University of Tokyo, Tokyo (JP)

(72) Inventors: Akira Maehara, Niigata (JP); Tadahisa Iwata, Tokyo (JP); Taku Omura, Tokyo (JP); Taizo Kabe, Sayo-gun (JP)

(73) Assignees: Mitsubishi Gas Chemical Company, Inc., Chiyoda-ku (JP); The University of Tokyo, Tokyo (JP)

( * ) Notice: Subject to any disclaimer, the term of this patent is extended or adjusted under 35 U.S.C. 154(b) by 227 days.

(21) Appl. No.: 18/000,446

(22) PCT Filed: Jun. 2, 2021

(86) PCT No.: PCT/JP2021/020957
§ 371 (c)(1),
(2) Date: Dec. 1, 2022

(87) PCT Pub. No.: WO2021/246434
PCT Pub. Date: Dec. 9, 2021

(65) Prior Publication Data
US 2023/0211539 A1      Jul. 6, 2023

(30) Foreign Application Priority Data

Jun. 2, 2020      (JP) ................................. 2020-096145

(51) Int. Cl.
*B29C 48/78* (2019.01)
*B29C 48/00* (2019.01)
(Continued)

(52) U.S. Cl.
CPC ............ *B29C 48/78* (2019.02); *B29C 48/022* (2019.02); *B29C 48/92* (2019.02); *D01F 6/625* (2013.01);
(Continued)

(58) Field of Classification Search
None
See application file for complete search history.

(56) References Cited

U.S. PATENT DOCUMENTS 4,997,909 A       3/1991   Doi
5,061,743 A  *  10/1991   Herring .................... C08K 3/22
                                                        524/436
(Continued)

FOREIGN PATENT DOCUMENTS

CN          101538750 A        9/2009
CN          102108563 A        6/2011
(Continued)

OTHER PUBLICATIONS

Machine translation of JP 2010241075 A, Oct. 28, 2010 (Year: 2010).*
(Continued)

*Primary Examiner* — Benjamin A Schiffman
(74) *Attorney, Agent, or Firm* — Oblon, McClelland, Maier & Neustadt, L.L.P.

(57) ABSTRACT

An object of the present invention is to provide a method for producing a polymeric molded product, which enables expansion of a temperature range that can be used for partial melting. The method for producing a polymeric molded product, comprises subjecting a crystalline polyhydroxyalkanoate to a heating treatment at a temperature equal to or higher than a glass transition temperature; and melt-molding a polyhydroxyalkanoate yielded by the heating treatment, which comprises lamellar crystals that are different in lamel-
(Continued)

lar thickness, in a temperature range where some of the lamellar crystals undergo melting and flowing, and the other balance lamellar crystals remain unmelted.

8 Claims, 14 Drawing Sheets

(51) Int. Cl.
| | | |
|---|---|---|
| *B29C 48/92* | (2019.01) | |
| *D01F 6/62* | (2006.01) | |
| *D01F 6/84* | (2006.01) | |
| *B29K 67/00* | (2006.01) | |

(52) U.S. Cl.
CPC ............ *D01F 6/84* (2013.01); *B29K 2067/04* (2013.01); *B29K 2995/006* (2013.01)

(56) References Cited

U.S. PATENT DOCUMENTS

| | | | | |
|---|---|---|---|---|
| 5,516,565 | A | 5/1996 | Matsumoto | |
| 5,693,389 | A * | 12/1997 | Liggat ..................... | C08L 67/04 |
| | | | | 525/450 |
| 5,917,002 | A | 6/1999 | Doi et al. | |
| 5,948,462 | A * | 9/1999 | Atsuta ..................... | A23L 13/65 |
| | | | | 426/585 |
| 6,005,066 | A * | 12/1999 | Lehrle ..................... | C08K 5/175 |
| | | | | 435/71.1 |
| 6,111,006 | A | 8/2000 | Waddington | |
| 6,136,905 | A * | 10/2000 | Suzuki ..................... | C08K 3/36 |
| | | | | 264/331.12 |
| 6,417,294 | B1 * | 7/2002 | Obuchi ..................... | C08K 5/20 |
| | | | | 525/437 |
| 6,645,622 | B2 * | 11/2003 | Yamane ..................... | D01F 6/84 |
| | | | | 525/437 |
| 6,825,285 | B2 * | 11/2004 | Autran ..................... | C08L 67/04 |
| | | | | 525/450 |
| 7,011,289 | B2 * | 3/2006 | Singh ..................... | F16K 11/07 |
| | | | | 251/30.01 |
| 7,241,495 | B2 * | 7/2007 | Iwata ..................... | D01F 6/625 |
| | | | | 428/394 |
| 7,329,723 | B2 * | 2/2008 | Jernigan ..................... | B01J 8/007 |
| | | | | 528/480 |
| 7,435,566 | B2 * | 10/2008 | Ogawa ..................... | C08G 63/90 |
| | | | | 435/135 |
| 7,718,720 | B2 * | 5/2010 | Padwa ..................... | C08K 5/0083 |
| | | | | 524/99 |
| 7,790,782 | B2 * | 9/2010 | Sato ..................... | C08K 5/0083 |
| | | | | 361/600 |
| 7,938,999 | B2 * | 5/2011 | Iwata ..................... | D01F 6/625 |
| | | | | 264/172.16 |
| 9,340,659 | B2 * | 5/2016 | Suzuki ..................... | C08K 5/053 |
| 9,475,934 | B2 * | 10/2016 | Abe ..................... | C08G 63/08 |
| 9,732,443 | B2 * | 8/2017 | Kikutani ..................... | D01F 6/625 |
| 10,030,117 | B2 * | 7/2018 | Koyama ..................... | C08K 5/053 |
| 10,173,360 | B2 * | 1/2019 | Miyazawa ..................... | B29C 49/18 |
| 10,519,473 | B2 * | 12/2019 | Kobayashi ..................... | C12Y 203/01 |
| 10,865,429 | B2 * | 12/2020 | Kobayashi ..................... | C12N 9/1029 |
| 11,279,957 | B2 * | 3/2022 | Maehara ..................... | C12P 7/62 |
| 11,466,120 | B2 * | 10/2022 | Maehara ..................... | C08G 63/06 |
| 2003/0088052 | A1 | 5/2003 | Yamane | |
| 2005/0001358 | A1 * | 1/2005 | Nakazawa ..................... | C08K 5/0083 |
| | | | | 524/415 |
| 2006/0055081 | A1 * | 3/2006 | Iwata ..................... | C08J 5/18 |
| | | | | 264/288.4 |
| 2006/0106130 | A1 | 5/2006 | Sato et al. | |
| 2006/0127998 | A1 | 6/2006 | Ogawa et al. | |
| 2008/0061467 | A1 | 3/2008 | Iwata et al. | |
| 2008/0139702 | A1 * | 6/2008 | De Almeida ..................... | C08K 5/05 |
| | | | | 524/14 |
| 2008/0226580 | A1 * | 9/2008 | Maeda ..................... | A61Q 19/008 |
| | | | | 424/78.02 |
| 2014/0088288 | A1 | 3/2014 | Iwata et al. | |

| | | | | |
|---|---|---|---|---|
| 2015/0210801 | A1 | 7/2015 | Abe et al. | |
| 2015/0291771 | A1 | 10/2015 | Suzuki et al. | |
| 2016/0230313 | A1 | 8/2016 | Kikutani et al. | |
| 2016/0251494 | A1 | 9/2016 | Koyama et al. | |
| 2017/0198313 | A1 | 7/2017 | Kobayashi et al. | |
| 2018/0305722 | A1 | 10/2018 | Kobayashi et al. | |
| 2020/0347416 | A1 | 11/2020 | Maehara | |
| 2021/0301127 | A1 | 9/2021 | Okura | |
| 2022/0203600 | A1 | 6/2022 | Maehara et al. | |
| 2022/0411830 | A1 * | 12/2022 | Arikawa ................. | C12P 7/625 |
| 2023/0219273 | A1 * | 7/2023 | Maehara ............... | B29C 48/022 |
| | | | | 264/176.1 |
| 2023/0398257 | A1 * | 12/2023 | Maehara ................... | D01F 6/84 |

FOREIGN PATENT DOCUMENTS

| | | | |
|---|---|---|---|
| CN | 102428119 A | 4/2012 | |
| EP | 0400855 A1 | 12/1990 | |
| EP | 0 826 803 A2 | 3/1998 | |
| EP | 1577346 A1 | 9/2005 | |
| EP | 3 042 987 A1 | 7/2016 | |
| EP | 3970948 A1 | 3/2022 | |
| EP | 4159901 A1 | 4/2023 | |
| JP | 64-69622 A | 3/1989 | |
| JP | 3-24151 A | 2/1991 | |
| JP | 4-61638 A | 2/1992 | |
| JP | 6-299054 A | 10/1994 | |
| JP | 6-345950 A | 12/1994 | |
| JP | 7-126496 A | 5/1995 | |
| JP | 7-177894 A | 7/1995 | |
| JP | 7-188537 A | 7/1995 | |
| JP | 8-27363 A | 1/1996 | |
| JP | 8-510498 A | 11/1996 | |
| JP | 9-131779 A | 5/1997 | |
| JP | 9-507441 A | 7/1997 | |
| JP | 9-278991 A | 10/1997 | |
| JP | 10-60099 A | 3/1998 | |
| JP | 10-504583 A | 5/1998 | |
| JP | 10-158369 A | 6/1998 | |
| JP | 10-176070 A | 6/1998 | |
| JP | 11-5849 A | 1/1999 | |
| JP | 11-116783 A | 4/1999 | |
| JP | 2002-371431 A | 12/2002 | |
| JP | 2003-192884 A | 7/2003 | |
| JP | 2003-238779 A | 8/2003 | |
| JP | 2003-327803 A | 11/2003 | |
| JP | 2003-328230 A | 11/2003 | |
| JP | 2003-328231 A | 11/2003 | |
| JP | 2004-250629 A | 9/2004 | |
| JP | 2006-282940 A | 10/2006 | |
| JP | 2007-77232 A | 3/2007 | |
| JP | 2007-505969 A | 3/2007 | |
| JP | 2007-517126 A | 6/2007 | |
| JP | 2009-24058 A | 2/2009 | |
| JP | 4245306 B2 | 3/2009 | |
| JP | 2010-229407 A | 10/2010 | |
| JP | 2010241075 A * | 10/2010 | ............ B29C 47/92 |
| JP | 2017-101256 A | 6/2017 | |
| JP | 2019-119839 A | 7/2019 | |
| JP | 2019-119840 A | 7/2019 | |
| WO | WO 94/28070 A1 | 12/1994 | |
| WO | WO 95/17454 A1 | 6/1995 | |
| WO | WO 95/34599 A1 | 12/1995 | |
| WO | WO 2/50461 A1 | 6/2002 | |
| WO | WO 2-055581 A2 | 7/2002 | |
| WO | WO 2004/029266 A1 | 4/2004 | |
| WO | WO 2004/058893 A1 | 7/2004 | |
| WO | WO 2005/066256 A1 | 7/2005 | |
| WO | WO 2006/012917 A1 | 2/2006 | |
| WO | WO 2006/038373 A1 | 4/2006 | |
| WO | WO 2008/099586 A1 | 8/2008 | |
| WO | WO 2012/133231 A1 | 10/2012 | |
| WO | WO 2014/068943 A1 | 5/2014 | |
| WO | WO 2015/029316 A1 | 3/2015 | |
| WO | WO 2015/052876 A1 | 4/2015 | |
| WO | WO 2015/146195 A1 | 10/2015 | |
| WO | WO 2017/056442 A1 | 4/2017 | |
| WO | WO 2019/044837 A1 | 3/2019 | |

(56) References Cited

FOREIGN PATENT DOCUMENTS

WO    WO 2020/040093 A1    2/2020
WO    WO 2020/230807 A1    11/2020
WO    WO 2021/246434 A1    12/2021

OTHER PUBLICATIONS

Combined Chinese Office Action and Search Report issued Mar. 27, 2024, in corresponding Chinese Patent Application No. 202180039544.7 (with English Translation of Category of Cited Documents), 8 pages.
International Preliminary Report on Patentability with Written Opinion issued on Dec. 6, 2022 in the corresponding International Application No. PCT/JP2021/020957, 13 pages.
Alistair J. Anderson et al., Occurrence, Metabolism, Metabolic Role, and Industrial Uses of Bacterial Polyhydroxyalkanoates, Microbiological Reviews, vol. 54, No. 4, 1990, pp. 450-472.
Hideki .Abe, et al., "Biosynthesis from gluconate of a random copolyester consisting of 3-hydroxy-butyrate and medium-chain-length 3-hydroxyalkanoates by *Pseudomonas* sp. 61-3", International Journal of Biological Macromolecules, vol. 16, No. 3, 1994, pp. 115-119.
Mikiya.Kato et Aal., "Biosynthesis of Polyester Blends by *Pseudomonas* sp. 61-3 from Alkanoic Acids" Bull. Chem. Soc. Jpn, vol. 69, 1996, pp. 515-520.
Hiromi Matsusaki et al., Cloning and Molecular Analysis of the Poly (3-hydroxybutyrate) and Poly (3-hydroxybutyrate-co-3-hydroxyalkanoate) Biosynthesis Genes in *Pseudomonas* sp. Strain 61-3, Journal of bacteriology, vol. 180, No. 24, 1998, pp. 6459-6467.
S. Kusaka et al., "Molecular mass of poly [(R)-3-hydroxybutyric acid] produced in a recombinant *Escherichia coli*", Appl. Microbiol. Biotechnol., 47, 1997, pp. 140-143.
Taizo Kabe et al., Physical and Structural Effects of Adding Ultrahigh-Molecular-Weight Poly[®-3-hydroxybutyrate] to Wild-Type Poly[®-3-hydroxybutyrate], Macromolecules, 45, 2012, pp. 1858-1865.
Taizo.Kabe et al., "Processing, Mechanical Properties, and Structure Analysis of Melt-Spun Fibers of P(3HB)/UHMW-P(3HB) Identical Blend", ACS synposium series on Biobased Monomers, Polymers, and Materials, Chapter 5, pp. 63-75.
Takeshi Chiba, Biodegradative Polymer, Bioplastic, Marine Degradative Journal of packaging science & technology, Japan, Vo. 28, No. 2, 2019, 109-115.
Chinese Office Action dated Oct. 24, 2024, in the corresponding Chinese Patent Application No. 202180039544.7 (7 pages).
Extended European Search Report dated Nov. 7, 2024, in the corresponding European Patent Application No. 21816826.8 (8 pages).
Analytical Examination of Dacron Production, 1st edition, Examination, Textile Industry Press, p. 199, Oct. 1982 (2 pages).
Japanese Office Action dated Jun. 17, 2025, issued in the corresponding Japanese patent application No. 2022-528860, 3 pages.

* cited by examiner

METHOD FOR PRODUCING POLYMERIC MOLDED PRODUCT COMPRISING PRETREATMENT BY HEATING

CROSS-REFERENCE TO RELATED APPLICATIONS

The present application is a 35 U.S.C. § 371 national stage patent application of International patent application PCT/JP2021/020957, filed on Jun. 2, 2021, which is based on and claims the benefits of priority to Japanese Application No. 2020-096145, filed on Jun. 2, 2020. The entire contents of these applications are incorporated herein by reference.

BACKGROUND OF THE INVENTION

Field of the Invention

The present invention relates to a method for producing a polymeric molded product, characterized in that a temperature range that can be used in heat molding by subsequent partial melting is expanded by rearranging thicknesses of lamellar crystals of a crystalline polyhydroxyalkanoate.

Description of the Related Art

Polyhydroxyalkanoates (hereinafter abbreviated as PHAs in some cases) are thermoplastic polyesters that are accumulated in microorganisms and that have been drawing attention as a biodegradable, biocompatible, and bioabsorbable plastic, and many studies have been conducted (Non-Patent Document 1). One hundred (100) or more types of monomer units constituting PHA are known. Representative PHA is poly-3-hydroxybutyrate (hereinafter, abbreviated as P(3HB)) composed of (R)-3-hydroxybutyrate (also referred to as (R)-3-hydroxybutyric acid; hereinafter, abbreviated as 3HB) (Non-Patent Document 1).

P(3HB) has a melting point of approximately from 175 to 180° C., which is as high as that of polypropylene (hereinafter abbreviated as PP). P(3HB) has an equivalent fracture strength to that of PP, but has an elongation at fracture of 5% or less and a glass transition temperature of 4° C. (room temperature or lower).

P(3HB) is often not used for a molded body such as a single film, because it is highly crystalline, hard, and brittle. In a case where an attempt is made to industrially utilize PHA, as methods for improving the physical properties thereof (crystallinity, mechanical property, etc.), a method of introducing a second component monomer unit to form a copolymer, a method of increasing the molecular weight, a method of forming a complex with dissimilar polymeric materials, and the like have been known.

On the other hand, a crystallization rate of PHA is significantly slower than that of a traditional industrial polymer, and its glass transition temperature is room temperature or lower. In a case where PHA is molded through a heat-melted state, there are some problems in mold processing; for example, that a cooling time for solidification is long, which leads to poor productivity; that, in melt-spinning, due to slow crystallization, yarns are wound in an amorphous state which leads to agglutination of the yarns; that the yarns must be wound so as not to overlap in order to avoid agglutination; and that a long cooling time is required for solidification (crystallization) after winding. In addition, the slow crystallization rate leads to considerable growth of spherulites, and also affects deterioration in physical properties of the molded product and the deterioration over time. Copolymerization may cause a further lower nucleation density, i.e., a reduction in crystallization rate, and the above-described problems in mold processing still remain even when copolymerization is performed. Furthermore, there is another problem that melt viscosity is too high when the molecular weight is high.

Various crystal nucleating agents have been investigated for the purpose of improving the crystallization rate in melt-molding of thermoplastic polymeric materials such as polyesters.

As a known crystal nucleating agent, for example, adding the following materials to a specific polyester is known:
  an inorganic substance, as a simple substance, such as Zn powder, Al powder, graphite, or carbon black;
  a metal oxide such as ZnO, MgO, Al2O3, TiO2, MnO2, SiO2, or Fe3O4;
  a nitride such as aluminum nitride, silicon nitride, titanium nitride, or boron nitride; an inorganic salt such as Na2CO3, CaCO3, MgCo3, CaSO4, CaSiO3, BaSO4, or Ca3 (PO4) 3;
  a clay such as talc, kaolin, clay, or white clay;
  an organic salt such as calcium oxalate, sodium oxalate, calcium benzoate, calcium phthalate, calcium tartrate, magnesium stearate, or polyacrylate;
  a polymeric compound such as polyester, polyethylene or polypropylene;
  or the like (Patent Document 1).

Further, as a crystal nucleating agent for PHA, granules such as talc, atomized mica, boron nitride, and calcium carbonate have been tried. As a more effective method, there is known a method of tightly mixing organic phosphonic acids such as cyclohexyl phosphonic acid or organic phosphinic acids or esters thereof, or derivatives of the acids or esters, and metal compounds such as oxides, hydroxides and saturated or unsaturated carboxylic acid salts of metals belonging to Groups IA to VA or Groups IB to VB of the periodic table together (Patent Document 2).

Furthermore, the following materials are known as nucleating agents for PHA:
  sorbitol and sodium benzoate (Patent Document 3);
  sugar alcohols such as erythritol, D-arabitol, ribitol, xylitol, galactitol, D-mannitol, L-mannitol, D-sorbitol, myo-inositol, and scyllo-inositol (Patent Document 4);
  polyvinyl alcohol, chitin, and chitosan (Patent Document 5);
  polyalkylene oxides such as polyethylene oxide, polypropylene oxide, and polybutylene oxide (Patent Document 6);
  aliphatic carboxylic acid amides, aliphatic carboxylic acid salts, aliphatic alcohols, and aliphatic carboxylic acid esters to aliphatic polyesters such as polylactic acid and PHA (Patent Document 7 to 9);
  fatty acid esters such as dimethyl adipate, di-2 ethyihexyl adipate, diisobutyi adipate, dibutyl adipate, diisodecyl adipate, dibutyl diglycol adipate, dibutyl sebacate, and di-2 ethylhexyl sebacate (Patent Document 10);
  cyclic compounds having C=O and a functional group selected from NH, S, and O in the molecule, such as indigo, quinacridone, and quinacridone magenta (Patent Document 11);
  ketopyrroles which are cyclic compounds having C=O and an NH group in the molecule (Patent Document 12);
  sorbitol-based derivatives such as bisbenzylidene sorbitol and bis(p-methylbenzylidene)sorbitol (Patent Document 13);

compounds containing nitrogen-containing heteroaromatic nuclei such as pyridine, pyrimidine, pyrazine, pyridazine, triazine and imidazole (Patent Document 14);

phosphoric acid ester compounds (Patent Document 15);

bisamides of higher fatty acids and metal salts of higher fatty acids (Patent Document 16);

fatty acids and fatty acid amides (Patent Document 17);

branched polylactic acids (Patent Document 18);

pentaerythritol (Patent Document 19);

pentaerythritol and inorganic and organic fillers (Patent Document 20);

sorbitol acetal, compounds having an amide bond, and pentaerythritol (Patent Document 21)

amino acids such as tryptophan, phenylalanine, p-chloro-phenylalanine, m-tyrosine, phenylglycine, p-hydroxy-phenylglycine, methionine, o-tyrosine and valine, and phosphatidylcholine (Patent Documents 22 to 24);

dipeptides such as aspartame (Patent Document 25); and nucleic acid bases such as uracil and thymine (Patent Document 26).

These are means employed to promote the slow crystallization rate of aliphatic polyesters such as PHA and polylactic acid and to improve processability during formation and processing; however, there are still problems, such as causing a reduction in strength, exhibiting an insufficient effect including deterioration in surface appearance of a molded body, and requiring further addition of another additive. In addition, due to progress of crystallization after molding depending on the type of nucleating agent, the nucleating agent may be pushed out of the crystal due to differences in compatibility and molecular weight, thereby causing bloom and bleeding. In such cases, additives may be further required, such as dispersing agents, anti-aggregation agents, compatibilizers, and the like. The above nucleating agents also include those including non-toxic fatty acids and amino acids that are easily decomposed and absorbed or metabolized in the body, assuming that they will be used in the living body, but, at present, substantially effective crystal nucleating agents have not been found yet.

Also, attempts have also been made to blend other PHAs and biodegradable polymers for the purpose of improving the crystallization properties of PHA. Patent Documents 27 to 29 disclose addition of P(3HB) having a higher melting point, as a crystal nucleating agent (nucleating material), to a P(3HB-co-3HV) copolymer comprising 3HB and 3-hydroxyvalerate (3-hydroxyvaleric acid, hereinafter abbreviated as 3MV), a P(3HB-co-3HHx) copolymer comprising 3HB and 3-hydroxyhexanoate (abbreviated as 3-hydroxyhexanoic acid, hereinafter abbreviated as 3HHx), or a P(3HB-co-3HO) copolymer comprising 3HB and 3-hydroxyoctanoate (3-hydroxyoctanoic acid, hereinafter abbreviated as 3110).

Patent Documents 27 to 29 describes mixing methods such as:

dry mixing in which blended dry powder PHA is mixed as it is or in the presence of dry ice;

solution mixing in which PHA is stirred and mixed while it is partially or wholly dissolved in a solvent such as chloroform, then the solvent is evaporated to precipitate a polymer, or to precipitate it in a poor solvent; and so-called partial melt mixing in which PHA is sufficiently stirred and mixed at a temperature where added P(3HB) having a higher melting point is not melted, and added PHA having a lower melting point (in the Examples, P(3HB-co-3HV), P(3HB-co-3HHx), or P(3HB-co-3HO)) is in a melted state, and refers to necessity that a small amount of the mixed P(3HB) having the higher melting point should be finely and uniformly dispersed in the PHA copolymer having the lower melting point.

Each of the mixing methods described above has a disadvantage. In the dry mixing, even though the polymer powder is mixed, there is a limit in uniform mixing at or below a powder particle size. The solution mixing requires a large amount of a good solvent such as chloroform. In a case where reprecipitation and recovery are performed, a still larger amount of the poor solvent is required, which is from 5 to 10 times the amount of the good solvent, and the polymer species that precipitate due to a difference in solubility during reprecipitation may be biased. Even in a partially melted state of the blend, the added P(3HB) having high crystallinity and a high melting point may not be suitable for forming a fine uniform microcrystalline nucleus, since P(3HB) particles may be mixed without melting at approximately its intact size. The method, in which mixing is performed at a temperature raised to be equal to or higher than the melting point of P(3HB), such that the blend is uniformly mixed, is general melt mixing, but, near the melting point of P(3HB), PH As which include P(3HB) are inevitably deteriorated by thermal decomposition and stirring, and lowered in molecular weight.

Not a method for promoting crystallization by blending P(3HB) once taken out from bacterial cells and PHA copolymers, but a method has also been reported, wherein P(3HB) and 3HB-rich PHA, which can serve as crystal nuclei, are produced, as blend bodies, together with other PHA copolymers in bacterial cells during culture, and thus P(3HB) and PHA need not to be blended after PHA is taken out from the bacterial cells. Patent Document 30 describes a method for producing P(3HB-co-3HHx) with a low ratio of P(3HB) or 3HHx, together with P(3HB-co-3HHx) having an increased ratio of 3HHx, by changing feed of carbon sources in the middle of culture. Patent Documents 31 and 32 disclose methods of producing a blend body of PHAs having different melting points in the same cell by retaining a plurality of kinds of PHA polymerization enzymes different in substrate specificity in the same bacterial cell by a gene recombination technique. Although these patent documents describe that mold processing can be performed at a temperature of 170° C. or lower, it is unclear in what temperature range melting and processing can be performed. In known mold processing, it is common to perform molding after melting at a temperature not lower than the melting point of the polymer, and the patent documents also aim at improving the solidification rate (crystallization rate) of once melted PHA blend bodies.

In Non-Patent Documents 2 to 4, P(3HB) is not intended to serve as crystalline nuclei. However, these Non-Patent Documents describe a PHA-producing wild strain that produces a blend of P(3HB) and a PHA copolymer in the same bacterium, and also describe blend production of P(3HB) homopolymers and C4 to C12 PHA copolymers, by naturally retaining PHA polymerizing enzymes with different substrate specificities in the same cell.

On the other hand, there are also a report on the use of an ultra-high molecular weight body P(3HB), and a report that strength is increased by controlling crystal formation independently of molecular weight. For example, an ultra-high molecular weight P(3HB) having a number average molecular weight of 1.5 million or greater (weight average molecular weight: 3 million) using a recombinant *E. coli* has been biosynthesized, and a P(3HB) film with improved physical properties has been obtained using the ultra-high molecular weight P(3HB) (Patent Document 33 and Non-Patent Document 5).

Furthermore, as a method of fiberization of P(3HB) independent of molecular weight, P(3HB) fibers have been obtained by melt extruding P(3HB); rapidly cooling the extruded P(3HB) to a glass transition temperature+15° C. or lower, solidifying it to produce amorphous fibers; cold drawing the amorphous fibers; orienting molecular chains of the amorphous fibers; and thermally treating the fibers (Patent Documents 34 and 35). Furthermore, there is also disclosed (Patent Document 36) a method for producing a fiber that is characterized by quenching the melt extruded fiber to a temperature not higher than a glass transition temperature +15° C. and then solidifying the melt extruded fiber to produce amorphous fiber, and leaving the amorphous fiber to stand at a temperature not higher than a glass transition temperature of PHA +15° C. to form crystallized fibers in which the microcrystalline nuclei have been formed (isothermal crystallization), and then subjecting the crystallized fibers to stretching and, further heat treatment under tension (referred to as "microcrystalline nucleus-stretching method" hereinafter).

However, the producing efficiency of the ultra-high molecular weight P(3HB) is poor so that cost is expensive, the cold stretching method requires quenching the melt to a low temperature near the glass transition temperature to obtain amorphous fibers, and the microcrystalline nucleus-stretching method requires quenching the fiber to a low temperature near the glass transition temperature to produce the micro-crystals of the melted P(3HB) and then storing the fiber at the low temperature for a long period of time. Therefore, the methods described above are industrially disadvantageous.

Non-Patent Document 6 describes the method of adding an ultra-high molecular weight body P(3HB) having a weight average molecular weight of 2.70 million made by recombinant *E. coli* to P(3HB) derived from an ordinary microorganism and having a weight average molecular weight of 520000, dissolving the mixture in chloroform, then molding it into a cast film, hot-pressing the cast film at 200° C., quenching the cast film with ice water, and then cold-stretching the cast film to produce a trace ultra-high molecular weight body-added P(3HB) film. It is suggested that, in the crystal growth observation, the trace ultra-high molecular weight body-added P(3HB) film after reheating at 200° C. behaves like a nucleating agent and promotes nucleation. There is a report that ultra-high molecular weight P(3HB) having a weight average molecular weight of 3.47 million was added, in a small amount, to P(3HB) having a weight average molecular weight of 520000, and that the mixture was subjected to melt spinning at 180° C., 190° C., and 200° C. (Non-Patent Document 7). This document describes that, while the molecular weight was reduced by heating and melting at or above the melting point, the addition of the ultra-high molecular weight P(3HB) suppressed the thermal decomposition at an initial stage of decomposition of P(3HB) and improved the processability of melt spinning. It has been reported that blend P(3HB) fibers with addition of 5 wt. % of ultra-high molecular weight P(3HB) exhibited a strength of 740 MPa by cooling the fiber to 4° C. after melt spinning and application of two-step cold stretching. Although the amount of the ultra-high molecular weight P(3HB) used can be small, two-stage cold stretching in a cooled state at 4° C. is required, the operation is complicated, and the method cannot be said to be suitable for industrialization.

In addition, it has been reported that, when a molding material composed mainly of a biodegradable polyester having a melting point in a specific range is melt-molded at a heating temperature in a specific range to produce a melt-molded product, a cold crystallization heat, and a sum of the melting heat and the cold crystallization heat are set to specific ranges as indexes of crystallization ability and the degree of crystallinity of each obtained melt-molded product to produce a melt-molded product (Patent Document 37). Furthermore, it has been reported that a copolymer of 3HB and 3-hydroxyhexanoate is processed at a temperature (around 160° C.) at which the crystals of the copolymer are not completely melted (Non-Patent Document 8). Furthermore, a tube comprising a poly (3-hydroxybutyrate)-based resin has been reported, in which a difference between a melting point peak temperature and a melting point peak end temperature in differential scanning calorimetry of the poly (3-hydroxybutyrate)-based resin is 10° C. or greater (Patent Document 38). Furthermore, a method for producing a biodegradable resin molded body has been reported, characterized in that, when a biodegradable resin composition containing poly(3-hydroxy alkanoate) is heat melted and kneaded to mold a molded body, a residual crystal amount at an outlet of a molding machine after heat melting and kneading is confirmed by near-infrared spectroscopic spectra, and the residual crystal amount at the outlet of the molding machine is adjusted so that a crystallization peak of the molded body by near-infrared spectroscopy is observed within 200 seconds immediately after molding (Patent Document 39). However, this patent document does not describe that the melt-molding temperature is set to a temperature which is higher than an outflow onset temperature according to a flow tester temperature raising method and indicates that crystal melting as measured by a differential scanning calorimeter is entirely completed (in particular, a temperature lower than an extrapolated melting offset temperature).

Patent Document 1: JP 07-126496 A
Patent Document 2: JP 03-024151 A
Patent Document 3: WO 20061012917
Patent Document 4: WO 2008/099586
Patent Document 5: JP 2007-077232 A
Patent Document 6: JP 2010-229407 A
Patent Document 7: JP 09-278991 A
Patent Document 8: JP 11-005849 A
Patent Document 9: JP 07-188537 A
Patent Document 10: JP 11-116783 A
Patent Document 11: JP 2003-238779 A
Patent Document 12: JP 2003-327803 A
Patent Document 13: JP 10-158369 A
Patent Document 14: JP 2007-517126 T
Patent Document 15: JP 2003-192884 A
Patent Document 16: JP 6-299054 A
Patent Document 17: JP 8-27363 A
Patent Document 18: JP 2009-024058 A
Patent Document 19: JP 2017-101256 A
Patent Document 20: WO 2015/052876
Patent Document 21: WO 2014/068943
Patent Document 22: JP 2006-282940 A
Patent Document 23: JP 06-345950 A
Patent Document 24: JP 10-504583 T
Patent Document 25: JP 2019-119839 A
Patent Document 26: JP 2019-119840 A
Patent Document 27: JP 08-510498 T
Patent Document 28: WO 2002/055581
Patent Document 29: WO 2002/050461
Patent Document 30: JP 2004-250629 A

7

Patent Document 31: WO 2015/146195
Patent Document 32: WO 2017/056442
Patent Document 33: JP 10-176070 A
Patent Document 34: JP 2003-328230 A
Patent Document 35: JP 2003-328231 A
Patent Document 36: WO 2006/038373
Patent Document 37: JP 4245306 B
Patent Document 38: WO 2020/040093
Patent Document 39: JP 2010-241075 A
Non-Patent Document 1: Alistair J. Anderson et al., Micro-biological Reviews, Vol. 54, No. 4, 450-472, 1990
Non-Patent Document 2: H. Abe, et al., International Journal of Biological Macromolecules, 1994, vol. 16, 115-119.
Non-Patent Document 3: M. Kato et Aal., Bull. Chem. Soc. Jpn, 1996, vol. 69, 515-520.
Non-Patent Document 4: H. Matsusaki et al., Journal of bacteriorogy, 1998, vol. 180, 6459-6467.
Non-Patent Document 5: Kusaka et al., Appl. Microbiol. Biotechnol., 47 140-143 (1997). Molecular mass of poly [(R)-3-hydroxybutyric acid] produced in a recombinant *Escherichia coli*.
Non-Patent Document 6: T. Kabe et al., Macromolecules, 2012, 45, 1858-1865.
Non-Patent Document 7: T. Kabe en al., ACS synposium series on Biobased Monomers, Polymers, and Materials, Chaper 5, 63-75.
Non-Patent Document 8: Journal of packaging science & technology, Japan, Vo.28, No. 2 (2019) 109-115

BRIEF SUMMARY OF THE INVENTION

As described above, known methods have been developed from the following perspectives: melting a crystalline polymer (polyester) that crystallizes slowly and then rapidly subjecting the polymer to primary nucleation; preventing formation of large defective spherulites; crystallizing the polymer so as to increase strength; and solidifying and crystallizing the polymer so that it can be easily processed. In melt-molding of a biodegradable crystalline polymer, various attempts have been made to promote crystallization for the purpose of improving poor processability due to slow crystallization rate and increasing strength. However, there is still room for improvement.

As a means for solving the above objects, a method has been studied in which melt-molding can be performed in a state where fine but thick lamellar crystals are not melted, by melting (that is, partially melting) a polymer at a temperature which is lower than a temperature where the entire polymer can be melted, and at which amorphous regions and fine lamellar crystals that are relatively thin, and have a lower-melting-point undergo flowing. It has been found that when the polymeric molded product is produced by such partial melting, the temperature range that can be used for partial melting may be narrow. An object of the present invention is to provide a method for producing a polymeric molded product, the method enabling expansion of a temperature range that can be used for partial melting.

As a result of diligent studies to solve the above problems, the present inventors have found that the temperature range that can be used in heat molding by partial melting can be expanded by subjecting a crystalline polyhydroxyalkanoate to a heating treatment at a temperature equal to or higher than a glass transition temperature, followed by partial melt-molding. The present invention has been completed based on the findings described above.

According to the present invention, the following inventions are provided.

<1> A method for producing a polymeric molded product, which comprises subjecting a crystalline polyhydroxyalkanoate to a heating treatment at a temperature equal to or higher than a glass transition temperature; and melt-molding a polyhydroxyalkanoate yielded by the heating treatment, which comprises lamellar crystals that are different in lamellar thickness, in a temperature range where some of the lamellar crystals undergo melting and flowing, and the other balance lamellar crystals remain unmelted.

<2> The method according to <1>, wherein the heating treatment is a heating treatment mediated by a gas, a liquid or a solid.

<3> The method according to <1> or <2>, wherein the heating treatment is a heating treatment mediated by a liquid, and wherein the polyhydroxyalkanoate is not completely dissolved in the liquid in a heated state.

<4> The method according to any one of <1> to <3>, wherein the temperature range is a range which is higher than an outflow onset temperature determined in accordance with a flow tester temperature raising method and lower than a temperature indicating completion of crystal melting determined by a differential scanning calorimeter.

<5> The method according to any one of <1> to <4>, wherein the temperature range is a range which is higher than the outflow onset temperature determined in accordance with the flow tester temperature raising method and lower than an extrapolated melting offset temperature.

<6> The method according to any one of <1> to <5>, which comprises cooling the melted polymer in air, in the temperature range where some of the lamellar crystals undergo melting and flowing, and the other balance lamellar crystals remain unmelted.

<7> The method according to any one of <1> to <6>, wherein heat molding is molding through melt extrusion.

<8> The method according to any one of <1> to <7>, wherein the heat molding is molding through melt extrusion spinning.

<9> The method according to any one of <1> to <8>, wherein the crystalline polyhydroxyalkanoate is a copolymer comprising 3-hydroxybutyric acid and 4-hydroxybutyric acid as monomer units.

<10> The method according to any one of <1> to <9>, wherein the crystalline polyhydroxyalkanoate is a copolymer comprising 3-hydroxybutyric acid and 4-hydroxybutyric acid as monomer units, and a proportion of the 4-hydroxybutyric acid is 5 mol % or greater and 40 mol % or less.

The method for producing a polymeric molded product according to the present invention enables expansion of a temperature range that can be used for partial melting.

9 raising method, of Sample S4 (P(3HB-co-13.1 mol % 4HB). An extrapolated melting offset temperature of Sample S4 and a temperature at which the DSC curve returns to a baseline are illustrated.

Figure 6:
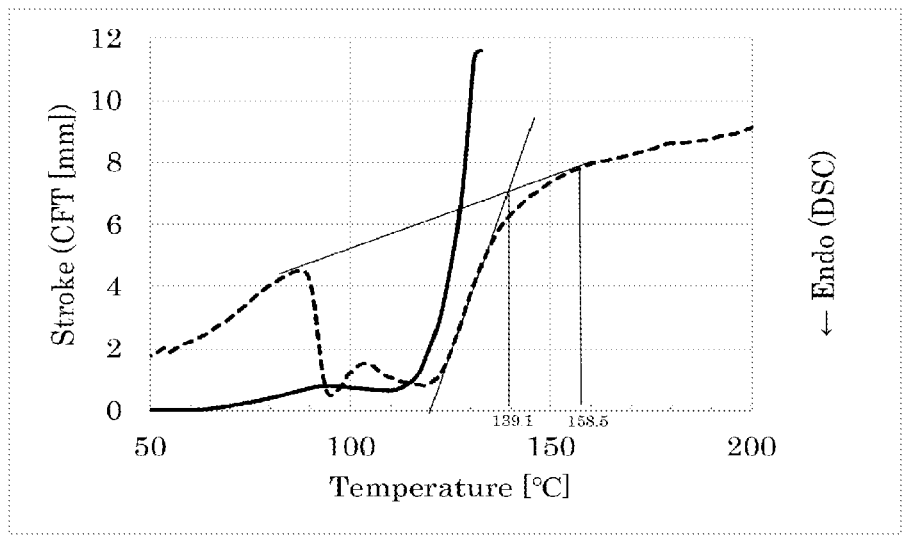

FIG. 6 shows a flow curve (solid line) and a DSC curve (dashed line), according to the Dow tester temperature raising method, of Sample S5 (P(3HB-co-13.1 mol % 4HB). An extrapolated melting offset temperature of Sample S5 and a temperature at which the DSC curve returns to a baseline are illustrated.

Figure 7:
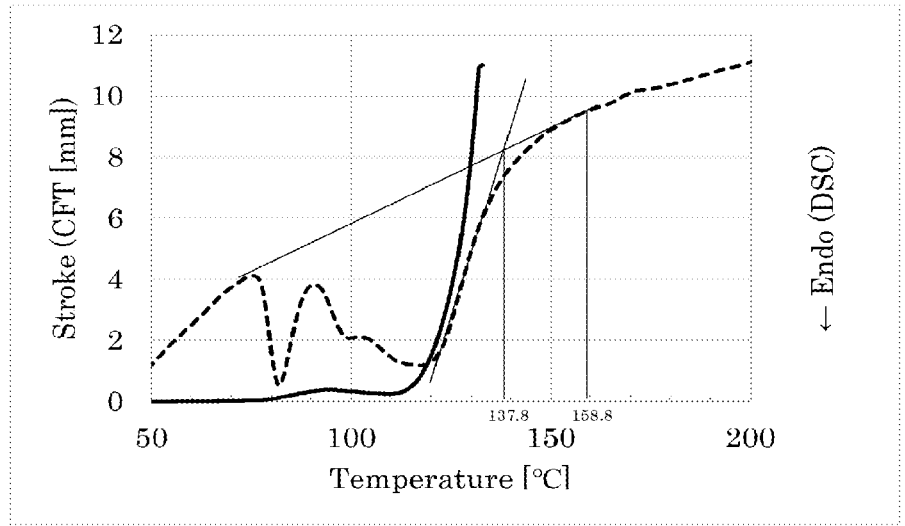

FIG. 7 shows a flow curve (solid line) and a DSC curve (dashed line), according to the flow tester temperature raising method, of Sample S6 (P(3HB-co-13.1 mol % 4HB). An extrapolated melting offset temperature of Sample S6 and a temperature at which the DSC curve returns to a baseline are illustrated.

Figure 8:
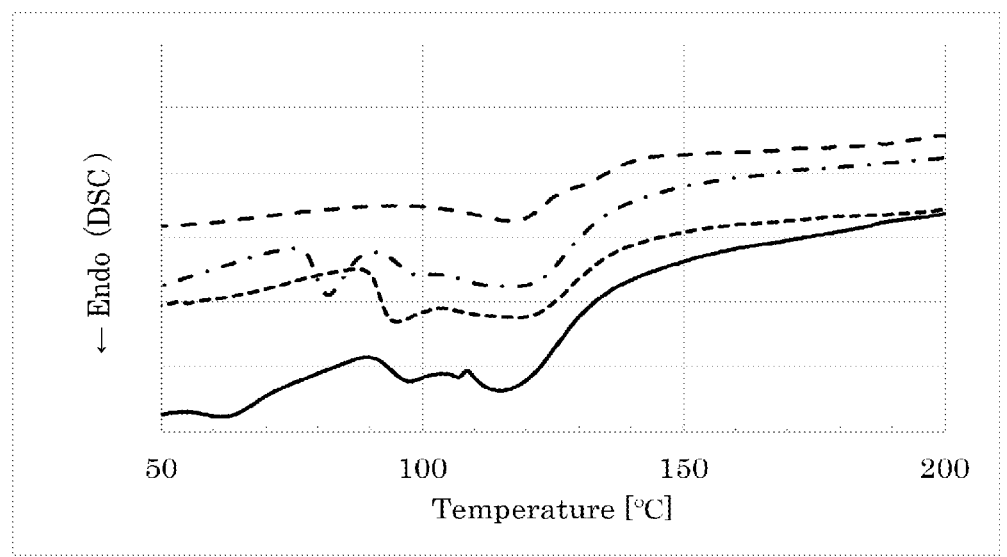

FIG. 8 shows superposition of the DSC curves of Sample S4 (solid line), Sample S5 (dashed line), Sample 6 (dashed-dotted line), and Sample S7 (roughly dashed line).

Figure 9:
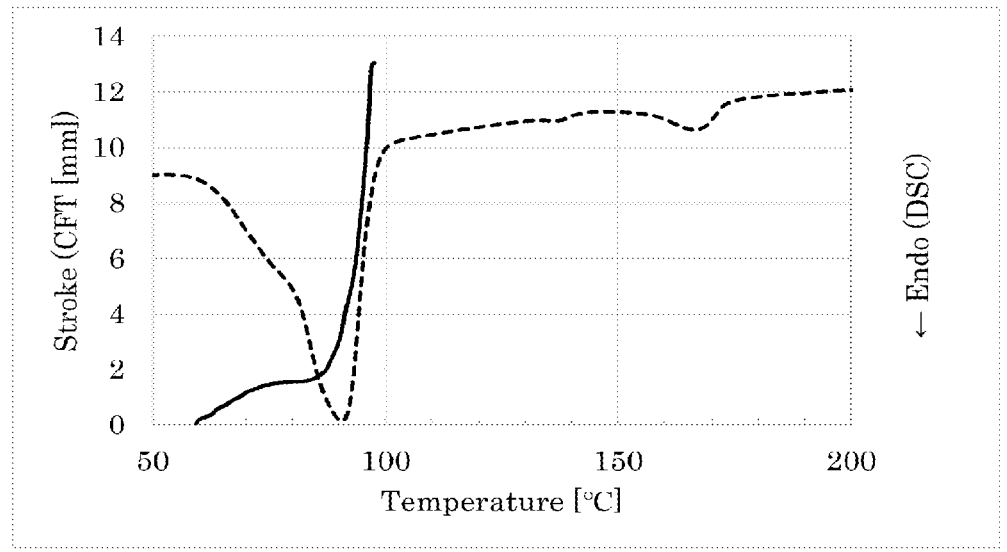

FIG. 9 shows a flow curve (solid line) and a DSC curve (dashed line), according to the flow tester temperature raising method, of Sample S8 (P(3HB-co-61.5 mol % 3HV).

Figure 10:
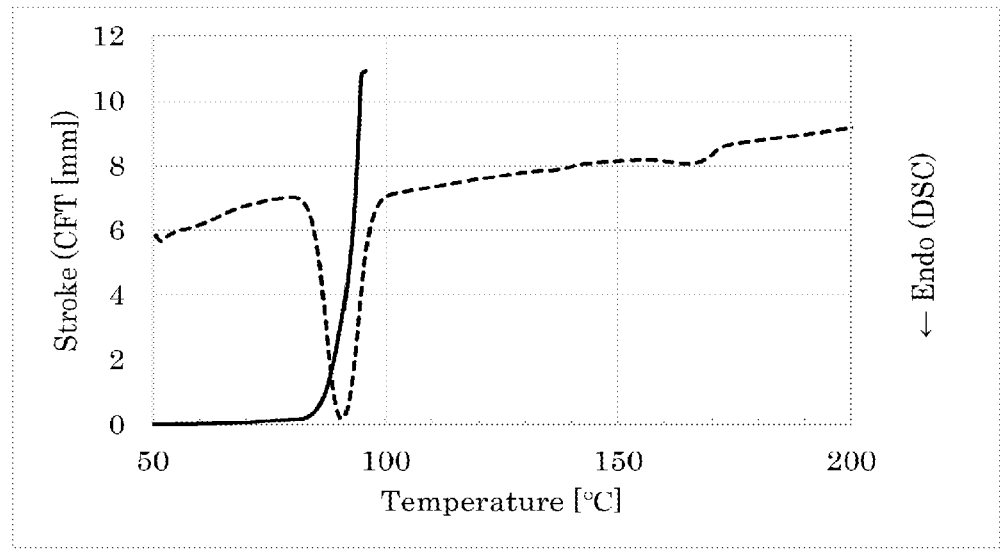

FIG. 10 shows a flow curve (solid line) and a DSC curve (dashed line), according to the flow tester temperature raising method, of Sample S9 (P(3HB-co-61.5 mol % 3HV).

Figure 11:
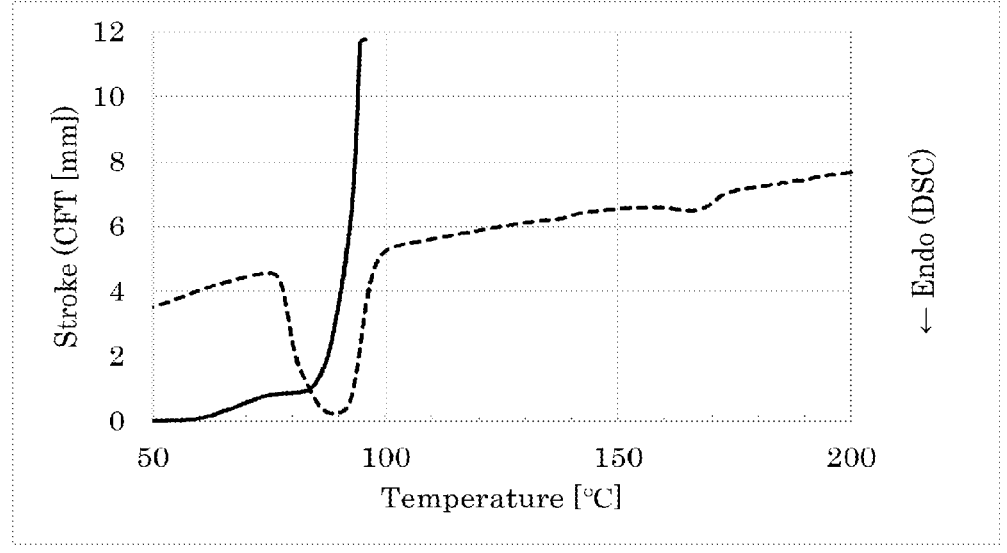

FIG. 11 shows a flow curve (solid line) and a DSC curve (dashed line), according to the flow tester temperature raising method, of Sample S10 (P(3HB-co-61.5 mol % 3HV).

Figure 12:
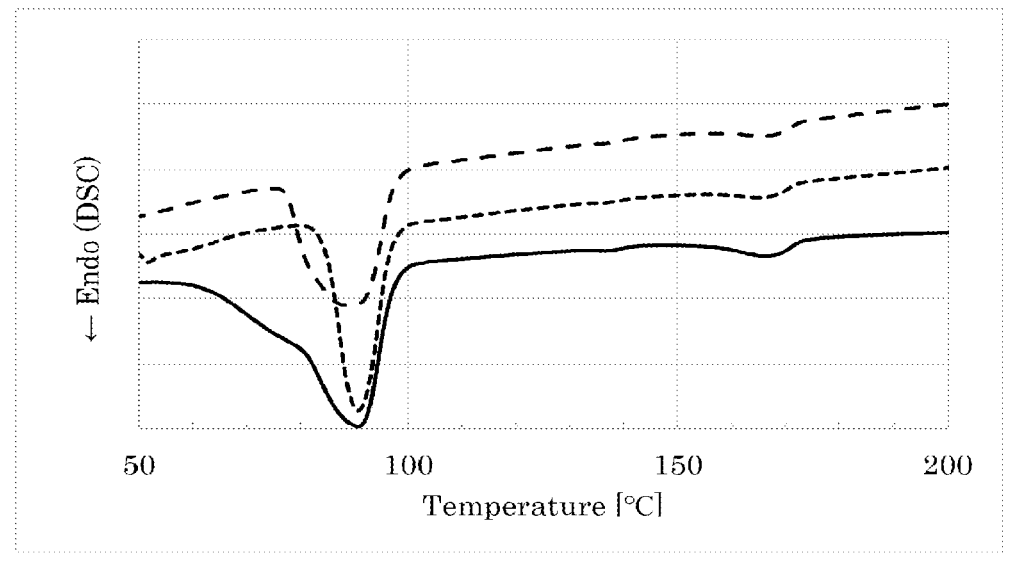

FIG. 12 shows superposition of the DSC curves of Sample S8 (solid line), Sample S9 (dashed line), and Sample S10 (roughly dashed line).

Figure 13:
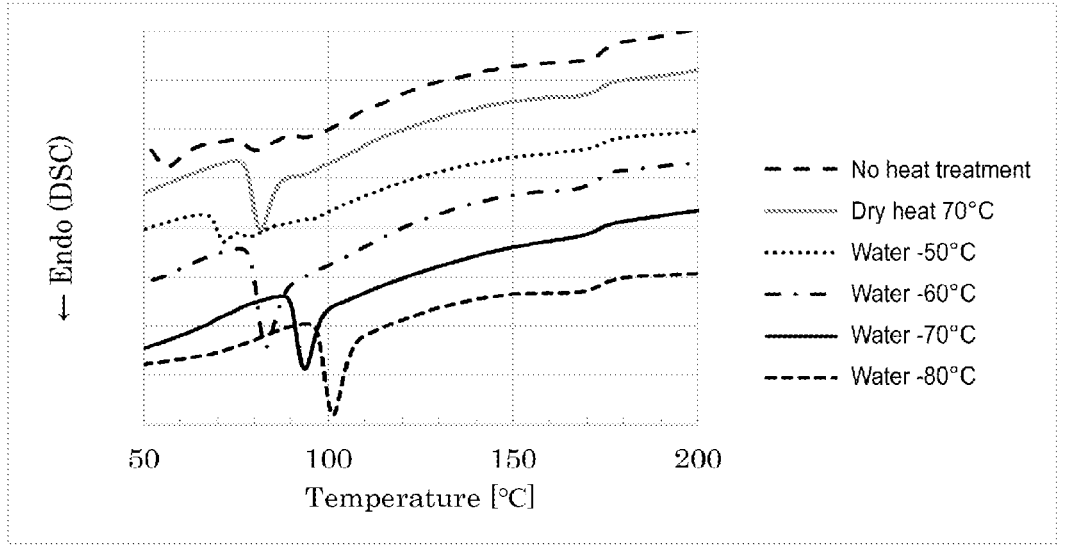

FIG. 13 shows changes in DSC curve in response to various heating pretreatments of Sample S11.

Figure 14:
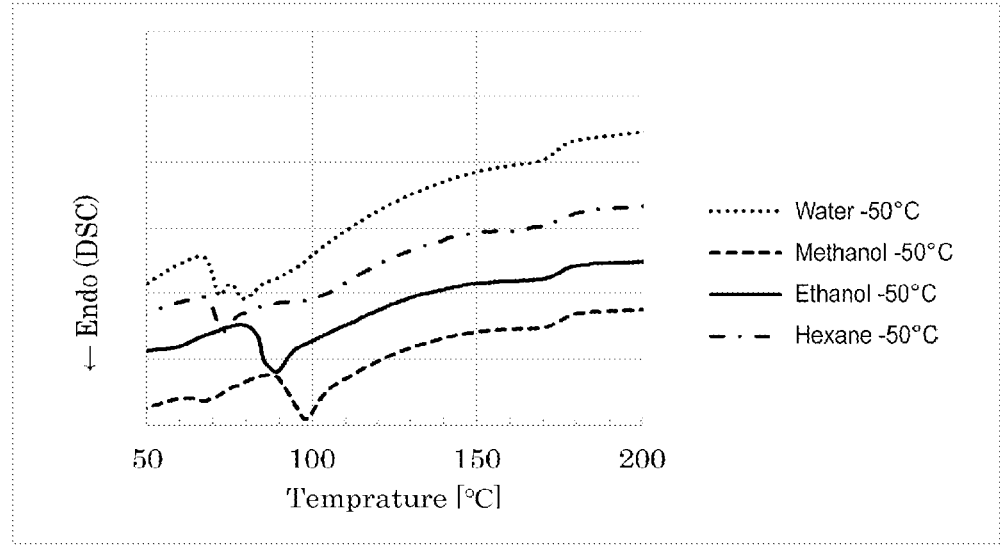

FIG. 14 shows changes in DSC curve in response to in-liquid heating treatments of Sample S11.

DETAILED DESCRIPTION OF THE INVENTION

The present invention will be described in detail below.

The method for producing a polymeric molded product according to the present invention which comprises subjecting a crystalline polyhydroxyalkanoate (PHA) to a heating treatment at a temperature equal to or higher than a glass transition temperature; and melt-molding a polyhydroxyalkanoate yielded by the heating treatment, which contains lamellar crystals that are different in lamellar thickness, in a temperature range where some of the lamellar crystals undergo melting and flowing, and the other balance lamellar crystals remain unmelted.

[Heating Treatment]

In the present invention, a crystalline polyhydroxyalkanoate is subjected to a heating treatment at a temperature equal to or higher than a glass transition temperature. The heating treatment makes it possible to rearrange the thicknesses of lamellar crystals, which enables expansion of a temperature range that can be used in melt-molding.

When an amorphous solid is heated, the solid that is as hard as a crystal and has no fluidity at a low temperature rapidly loses its rigidity and viscosity and increases in its fluidity in a narrow temperature range. This temperature is the glass transition temperature.

A heating temperature is desirably in a temperature range which is not lower than or equal to the glass transition temperature of the crystalline polyhydroxyalkanoate, and at which not all crystals are melted. In general, the crystalline polyhydroxyalkanoate can be subjected to a heating treatment at a temperature which is from 20 to 170° C. higher (preferably a temperature which is from 40 to 120° C. higher) than the glass transition temperature.

The heating time is not particularly limited, but heating can be performed typically from 1 hour to 72 hours, preferably from 6 hours to 48 hours, and more preferably from 12 hours to 36 hours.

A means for the heating treatment is not particularly limited, and the heating treatment may be any heating treatment mediated by a gas, a liquid, or a solid.

The heating treatment mediated by a gas refers to subjecting the crystalline polyhydroxyalkanoate to a heating treatment in a gas. Examples of the gas include air and an inert gas (such as nitrogen).

The heating treatment mediated by a liquid refers to subjecting the crystalline polyhydroxyalkanoate to a heating treatment in a liquid. Examples of the liquid include water, organic solvents such as lower alcohols (such as methanol and ethanol), polyhydric alcohols (such as glycerin and propylene glycol), hexane, and acetone, or mixtures thereof. It is preferable that, in the heating treatment mediated by a liquid, the polyhydroxyalkanoate should not be completely dissolved in the liquid in a heated state.

The heat treatment mediated by a solid refers to, for example, subjecting the crystalline polyhydroxyalkanoate to a heating treatment while the crystalline polyhydroxyalkanoate is in contact with a solid medium (for example, a plate). Examples of the solid include metals (such as aluminum, copper, silver, iron, and stainless steel), ceramics, and glass.

[Crystalline Polyhydroxyalkanoate]

The polyhydroxyalkanoate includes:

homopolymers of hydroxyalkanoic acids (for example, poly 3-hydroxypropionic acid, poly 3-hydroxybutyric acid, poly 3-hydroxyvaleric acid, poly 4-hydroxybutyric acid, poly 3-hydroxyhexanoic acid, poly 3-hydroxyoctanoic acid, poly 4-hydroxyvaleric acid, poly 4-hydroxyhexanoic acid, poly 5-hydroxyvaleric acid, poly 2-hydroxybutyric acid, poly 2-hydroxyvaleric acid, and poly 2-hydroxyhexanoic acid;

copolymers of hydroxyalkanoic acids (e.g., copolymer of 3-hydroxypropionic acid and 3-hydroxybutyric acid, copolymer of 3-hydroxypropionic acid and 3-hydroxyvaleric acid, copolymer of 3-hydroxypropionic acid and 4-hydroxybutyric acid, copolymer of 3-hydroxypropionic acid and 3-hydroxyhexanoic acid, copolymer of 3-hydroxypropionic acid and 3-hydroxyoctanoic acid, copolymer of 3-hydroxybutyric acid and 3-hydroxyvaleric acid, copolymer of 3-hydroxybutyric acid and 4-hydroxybutyric acid, copolymer of 3-hydroxybutyric acid and 3-hydroxyhexanoic acid, copolymer of 3-hydroxybutyric acid and 3-hydroxyoctanoic acid, copolymer of 3-hydroxyvaleric acid and 4-hydroxybutyric acid, copolymer of 3-hydroxyvaleric acid and 3-hydroxyhexanoic acid, copolymer of 3-hydroxyvaleric acid and 3-hydroxyoctanoic acid, copolymer of lactic acid and 3-hydroxypropionic acid, copolymer of lactic acid and 3-hydroxybutyric acid, copolymer of lactic acid and 3-hydroxyvaleric acid, copolymer of lactic acid and 3-hydroxybutyric acid, copolymer of lactic acid and 3-hydroxyhexanoic acid, copolymer of lactic acid and 3-hydroxyoctanoic acid, copolymer of glycolic acid and 3-hydroxypropionic acid, copolymer of glycolic acid and 3-hydroxybutyric acid, copolymer of glycolic acid and 3-hydroxyvaleric acid, copolymer of glycolic acid and 4-hydroxybutyric acid, copolymer of glycolic acid and 3-hydroxyhexanoic acid, copolymer of glycolic acid and 3-hydroxyoctanoic acid; and copolymers composed of three or more monomers such as terpolymers.

One of the polyhydroxyalkanoates can be used alone, or two or more thereof can be used in combination.

In the polyhydroxyalkanoate handled in the present invention, in order to form a polymer structure of a crystalline segment such as a lamellar crystal, a fringed micelle structure, a spherulite, a dendrite, a shish-kebab structure, or an extended chain crystal, it is desirable that a highly crystalline continuous monomer unit chain, for example, a chain of 3-hydroxypropionic acid, a chain of 3-hydroxybutyric acid, a chain of 3-hydroxyvaleric acid, a chain of 4-hydroxybutyric acid, a chain of 3-hydroxyhexanoic acid, a chain of 3-hydroxyhexanoic acid, a chain of 3-hydroxyoctanoic acid, a chain of 4-hydroxyvaleric acid, a chain of 4-hydroxyhexanoic acid, a chain of 5-hydroxyvaleric acid, a chain of 2-hydroxybutyric acid, a chain of 2-hydroxyvaleric acid, or a chain of 2-hydroxyhexanoic acid, which is a chain structure sufficient to yield a crystalline microstructure, should be repeatedly present in the polymer chain. When a stereoisomer or optical isomer is present for a monomer unit, a crystalline segment including a chain made of the same stereoisomer is required. For construction of the crystalline structure, the chain structure made of the identical stereoisomer such as a chain structure of the same stereoisomer such as a chain of R-3-hydroxybutyric acid, a chain of S-3-hydroxybutyric acid, a chain of R-3-hydroxyvaleric acid, a chain of S-3-hydroxyvaleric acid, a chain of R-3-hydroxyhexanoic acid, or a chain of S-3-hydroxyhexanoic acid, is an important element. In a case of polyhydroxyalkanoates comprising monomer units in which stereoisomers or optical isomers are present, crystallinity decreases and crystalline segments are less likely to be obtained. Particularly, in a case of biologically synthesizing a polymer comprising these monomer units, a two-component copolymer or three or more-component copolymer having a chain of R-3-hydroxybutyric acid and any other monomer unit incorporated therein as a second component is more preferable.

The polyhydroxyalkanoate may be produced by either a chemical synthesis method or a biosynthesis method. In order to secure the crystalline segment comprising the chain structure, when containing a monomer unit with a stereoisomer, the polyhydroxyalkanoate is desirably a copolymer comprising either stereoisomer, such as a copolymer of a copolymer of R-3-hydroxybutyric acid and 4-hydroxybutyric acid, or a copolymer of S-3-hydroxybutyric acid and 4-hydroxybutyric acid.

When the polyhydroxyalkanoate comprises a 3-hydroxybutyric acid unit and a 4-hydroxybutyric acid unit, a proportion of the 4-hydroxybutyric acid unit relative to all monomer units is preferably 5 mol % or greater and 40 mol % or less. The proportion of the 4-hydroxybutyric acid unit relative to all monomer units may be 6 mol % or greater, 7 mol % or greater, 8 mol % or greater, 9 mol % or greater, 10 mol % or greater, 11 mol % or greater, 12 mol % or greater, 13 mol % or greater, 14 mol % or greater, 15 mol % or greater, or 16 mol % or greater, and may be 17 mol % or greater, 18 mol % or greater, 19 mol % or greater, or 20 mol % or greater. The proportion of the 4-hydroxybutyric acid unit relative to all monomer units may be 35 mol % or less, 34 mol % or less, 33 mol % or less, 32 mol % or less, 31 mol % or less, 30 mol % or less, 29 mol % or less, 28 mol % or less, 27 mol % or less, 26 mol % or less, 25 mol % or less, 24 mol % or less, 23 mol % or less, 22 mol % or less, or 21 mol % or less.

When the polyester contains a 3-hydroxybutyric acid unit and a 3-hydroxyvaleric acid unit, a proportion of the 3-hydroxyvaleric acid unit relative to all monomer units is preferably 5 mol % or greater and 90 mol % or less. A proportion of the 3-hydroxyvaleric acid unit relative to all monomer units may be 5 mol % or greater, 6 mol % or greater, 7 mol % or greater, 8 mol % or greater, 9 mol % or greater, 10 mol % or greater, 15 mol % or greater, 20 mol % or greater, 25 mol % or greater, 30 mol % or greater, 35 mol % or greater, or 40 mol % or greater, and may be 45 mol % or greater, 50 mol % or greater, 55 mol % or greater, or 60 mol % or greater. The proportion of a 3-hydroxyvalerate unit relative to all monomer units may be 90 mol % or less, 85 mol % or less, 80 mol % or less, 75 mol % or less, 70 mol % or less, or 65 mol % or less.

<Molecular Weight of Polyhydroxyalkanoate>

For the polyhydroxyalkanoate, a weight average molecular weight determined by gel permeation chromatography, calibrated with polystyrene, is preferably 100000 or greater, and more preferably 200000 or greater, and, further, may be 300000 or greater, 400000 or greater, or 500000 or greater. The weight average molecular weight determined by gel permeation chromatography, calibrated with polystyrene, may be 600000 or greater, 700000 or greater, 800000 or greater, 900000 or greater, 1000000 or greater, 1100000 or greater, 1200000 or greater, 1300000 or greater, 1400000 or greater, 1500000 or greater, 2000000 or greater, 3000000 or greater, or 4000000 or greater. The upper limit of the weight average molecular weight determined by gel permeation chromatography, calibrated with polystyrene, is not particularly limited and is typically 20000000 or less, 10000000 or less, 8000000 or less, 7000000 or less, 6000000 or less, 5000000 or less, 4000000 or less, or 3000000 or less. However, considering reduction in molecular weight due to thermal decomposition and excessively high viscosity at the time of melting, when melt-molding is performed, the weight average molecular weight determined by gel permeation chromatography, calibrated with polystyrene, is preferably 400000 or greater and 2500000 or less, more preferably 500000 or greater and 2200000 or less, and even more preferably 600000 or greater and 2000000 or less.

When partial melt-molding is performed, it is often possible to employ a melting temperature at a lower temperature than a temperature range around 170° C. at which the molecular weight reduction due to thermal decomposition is observed. Thus, when partial melt-molding is performed, from the perspective of easily suppressing the molecular weight reduction due to thermal decomposition, the molecular weight of the polymer used may be a lower molecular weight than that used at the time of melt-molding, and the weight average molecular weight determined by gel permeation chromatography calibrated with polystyrene is desirably 200000 or greater and 2.5 million or less, and more preferably 400000 or greater and 2 million or less, and even more preferably 600000 or greater and 1.5 million or less.

Preferred Embodiment of Polyhydroxyalkanoate

The polymer of the present invention may be any one selected from a random polymer, a block polymer, an alternating polymer, or a grafted polymer, but is preferably a random polymer.

The polyhydroxyalkanoate may be a thermoplastic resin.

The polyhydroxyalkanoate is preferably a biodegradable polymer, and even more preferably a bioabsorbable polymer. Biodegradable means that the material can be decomposed by microorganisms or enzymes in the natural environment (e.g., soil, compost, lakes and marshes, and sea water) or decomposed into non-toxic components in vivo. Bioabsorbable means that the material can be metabolized by organisms, such as humans and animals.

A melting point of the polyhydroxyalkanoate is not particularly limited, but is preferably 180° C. or lower, more preferably 175° C. or lower (or lower than 175° C.), and even more preferably 170° C. or lower. The melting point of the polyhydroxyalkanoate may be 160° C. or lower, 150° C. or lower, 140° C. or lower, or 130° C. or lower. A lower limit on the melting point of the polyhydroxyalkanoate is not particularly limited, but is generally 40° C. or higher, and may be 50° C. or higher, 600° C. or higher, 70° C. or higher, 80° C. or higher, 90° C. or higher, or 100° C. or higher. In a case where the polyhydroxyalkanoate has a plurality of melting points, the melting point of the main component should be within the range described above.

[Melt-Molding]

In the present invention, a crystalline polyhydroxyalkanoate is melted in a temperature range which is not lower than an outflow onset temperature, the outflow onset temperature being measured when flowability of the crystalline polyhydroxyalkanoate is evaluated using a flow tester temperature raising method, and which is lower than a temperature indicating completion of crystal melting determined by a differential scanning calorimeter (DSC); the melted polyhydroxyalkanoate is then molded; and thus processability of a slow-crystallizing thermoplastic resin having poor processing properties can be improved.

By performing heat treatment at a temperature equal to or higher than the glass transition temperature prior to melt-molding, the temperature range that can be used in heat molding by subsequent partial melting can be expanded by rearranging the thicknesses of the lamellar crystals of the crystalline polyhydroxyalkanoate.

The "temperature indicating completion of crystal melting determined by a differential scanning calorimeter (DSC)" is preferably an extrapolated melting offset temperature of a melting peak. The extrapolated melting offset temperature of a melting peak can be determined as will be described in the Examples below. That is, when the melting peak is sharp, in accordance with JIS-K7121, the extrapolated melting offset temperature of the melting peak is a temperature at an intersection between a tangent line drawn at a point of maximum slope before the peak end and a baseline after the peak (as recognized by Thermo plus EVO software. Rigaku). When a plurality of melting peak shapes overlap, the tangent line is redrawn manually for the peak on a higher temperature side, and a point of intersection with the baseline is set as the extrapolated melting offset temperature.

Furthermore, typical melt-molding generally involves melting at a temperature not lower than a melting point, such as a melting point+20° C., a melting point+10° C. or a melting point+5° C., followed by molding. In contrast, when a polymer is molded in a partially melted state in accordance with the present invention, because the polymer is partially melted at a temperature lower than the melting point, in a case where the polymer has a melting point and a heat decomposition point close to each other, it is possible to suppress decomposition due to heat, that is, a reduction in molecular weight of the polymer after molding, and to maintain the high molecular weight of the polymer after molding. Thus, this is more beneficial also in terms of physical properties. Furthermore, the melting in a partially melted state is performed at a temperature lower than that in complete melting, and thus it is inferred that not only the thermal decomposition of the polymer, but also the hydrolysis of the molecular chain of the polyhydroxyalkanoate in which a minor amount of moisture mixed therein is involved in a heated state can be reduced. Therefore, it is generally desirable that a moisture content of a raw material be low, but the need to reduce and maintain the amount of moisture to attain a particularly low concentration is reduced. Thus, it is also expected that a special device for strictly maintaining a dry state of a dry raw material polyhydroxyalkanoate, preventing moisture in the atmosphere from entering the raw material polyhydroxyalkanoate in spinning or molding equipment, is not necessary.

Although the present invention improves the mold processability of polyester that slowly melts and crystallizes, and enhances productivity without adding a crystal nucleating agent, the present invention does not prevent the use of the crystal nucleating agent.

As an example of the present invention, P(3HB-co-4HB) can be used as the polyhydroxyalkanoate. In this case, the method of the present invention is characterized by comprising a step of melt extruding P(3HB-co-4HB) during melting thereof, at a temperature ranging from a temperature at which crystals comprising relatively thin lamellar crystals comprising a 3HB segment inside the polymer and an amorphous region start to melt and flow, to a temperature at which relatively thick lamellar crystals comprising a 3HB segment melt.

The present invention relates to a method for producing a biodegradable polyester molded product, characterized in that melt-molding is performed while a part of crystals comprising lamellar crystals contained in a polyhydroxyalkanoate remains, the remaining unmelted crystals serve as crystal nuclei, and thus molding can be performed without waiting for primary nucleation in common melt-molding.

Therefore, the method improves poor mold processability of a crystalline thermoplastic polyhydroxyalkanoate that slowly crystallizes, can perform molding immediately after partial melting without waiting for crystal primary nucleation, unlike in the case of complete melting, and improves productivity.

Since some of crystals including lamellar crystals that are already dispersed in bulk of the crystalline thermoplastic polyhydroxyalkanoate remain unmelted and act as crystal nuclei; a waiting time for primary nucleation is not required, and tackiness resulting from low crystallinity immediately after melt extrusion is also reduced; and molded bodies such as fibers and films are less likely to agglutinate, and can be wound and stretched immediately after melt spinning and immediately after film formation, improving productivity.

By melt spinning in a state where some of the crystals remain unmelted, and stretching immediately thereafter, the unmelted lamellar crystals are oriented, and the amorphous polymer chains are highly oriented. Monomer unit continuous segments which easily form crystals gather to promote crystallization. Melting at high temperatures that causes thermal decomposition is not performed, and thus the reduction in molecular weight due to thermal decomposition is suppressed. Thus, the molecular weight of the molded product is maintained, that is, deterioration due to heat is prevented. Furthermore, even if the polymer contains residual moisture or easily absorbs moisture in air, the temperature can be reduced by partial melt-molding. Therefore, a degree of hydrolysis in which heat and moisture are involved can also be reduced compared to that in a case of complete melt-molding, the reduction in molecular weight of the polyhydroxyalkanoate can be reduced, and the molecular weight of the molded product can be maintained.

In the present invention, the polyhydroxyalkanoate is melt-molded. When the polyhydroxyalkanoate is melt-molded, additives may be added as long as the effects of the present invention are not impaired.

Examples of the additives include one or more selected from antioxidants, thermal stabilizers (e.g., hindered phenols, hydroquinone, phosphites and substituents thereof), ultraviolet absorbers (e.g., resorcinol, and salicylate), anti-colorants (e.g., phosphite and hypophosphite), lubricants, release agents (e.g., montanic acid and metal salts thereof, esters thereof, half esters thereof, stearyl alcohol, stearamide and polyethylene waxes), colorants (e.g., dyes or pigments), carbon black as a conductive or colorant, plasticizers, flame retardants (e.g., bromine-based flame retardant, phosphorus-based flame retardant, red phosphorus, and silicone-based flame retardant), flame retardant aids, and antistatic agents.

A method of formulating an additive into the polyhydroxyalkanoate is not particularly limited, and includes dry blend, solution blending, and addition during chemical polymerization of the polyhydroxyalkanoate.

The polyhydroxyalkanoate can be subjected to known melt-molding such as injection molding, injection compression molding, compression molding, extrusion molding (melt extrusion molding), blow molding, press molding, and spinning (melt extrusion spinning).

The number of times of melt-molding is not particularly limited, but melt-molding can be performed only once.

In the present invention, a step of solidifying ater molding can be performed in a molding die, in a gas (e.g., air or nitrogen), or in a liquid (e.g., water, alcohol, glycerin or a mixture thereof). That is, solidification can be performed by cooling the polyhydroxyalkanoate partially melted according to the method of the present invention in a molding die, in a gas or in a liquid. Preferably, the partially melted polyhydroxyalkanoate can be cooled in a molding die, in air or in water. More preferably, the partially melted polyhydroxyalkanoate can be cooled in a molding die or in air.

Examples of a polyhydroxyalkanoate molded article produced by the method of the present invention include an injection molded article, an extrusion molded article, a press molded article, a sheet, a pipe, various films such as an unstretched film, a uniaxially stretched film and a biaxially stretched film, and various fibers such as an undrawn yarn and a super-drawn yarn. Note that the polymeric molded article produced by the method of the present invention may have a tube shape or may have a shape other than the tube shape.

Hereinafter, the present invention will be described in detail with reference to the following examples and comparative examples. The description of the examples and comparative examples in the specification of the present application is a description to assist in understanding the details of the present invention, which does not constitute grounds for narrowly interpreting the technical scope of the present invention.

EXAMPLES

<Polymer Used>

The poly 3-hydroxybutyric acid (P(3HB)) used was "BIOGREEN (Mw: 940000; melting point: approximately 175° C.; glass transition temperature: approximately 2° C.)" available from Mitsubishi Gas Chemical Company, Inc.

A P(3HB-co-4HB) copolymer can be produced by a culture method according to the method described in WO 2019/044837. P(3HB-co-4HB) copolymers having various 4HB ratios can be produced by appropriately changing the type and feed proportion of the carbon source to be used.

P(3HB-co-61.5 mol % 3HV) was produced by a culture method according to the method described in JP 01-069622 A.

As the method for extraction of PHA from a bacterial cell, a solvent extraction method of extracting PHA with a halogenated hydrocarbon solvent such as chloroform and precipitating it with a poor solvent such as hexane or methanol may be used as known, or a water-based extraction method may be used as described in JP 04-061638 A, JP 07-177894 A. and WO 2004029266.

<PHA Molecular Weight Measurement (Gel Permeation Chromatography (GPC) Method)>

The PHA molecular weight measurement was performed by gel permeation chromatography method as described below.

PHA was adjusted to approximately 0.5 mg/mL by adding chloroform and dissolved at 60° C. for 4 hours, and cooled to room temperature. Insoluble substances were filtered and removed by using a PTFE filter having a pore diameter of 0.2 μm to obtain a measurement sample. Conditions for GPC are as shown below.

Instrument: HPLC Prominence system, available from Shimadzu Corporation

Column: Shodex K-806L (two columns in series), available from Showa Denko K.K.

Column temperature: 40° C.

Mobile phase: Chloroform (1 mL/min)

Detector RI (40° C.)

Standards: Shodex polystyrene molecular weight standards (6870000 to 1270)

Injection amount: 60 μL

Analysis time: 30 minutes

<Measurement of Outflow Onset Temperature of PHA by Flow Tester>

PHA is subjected to measurement using a flow tester CET-500D (Capillary Rheometer Flowtester available from Shimadzu Corporation) or CFT-500EX available from Shimadzu Corporation). The sample amount used for measurement is approximately 1.2 g of PHA having a pellet shape, a powder shape, a film shape, or the like, and is measured by filling the sample in a cylinder. When a powdery polymer is used, the polymer may be molded using an appropriate granulator or press machine and filled in the cylinder. A die (nozzle) having a diameter of 1.0 mm and a thickness of 1.0 mm is used. An extrusion load of 5 kg is applied, preheating is performed for 240 seconds at an initial set temperature of from 30° C. to 140° C. (appropriately selected depending on the type and melting point of the polymer), and then the temperature is raised to a range from 130 to 260° C. (appropriately selected depending on the type and melting point of the polymer) at a constant rate of 3° C./min. The curves for the stoke length (mm) and the temperature for this process are determined. As the temperature is increased, PHA is heated, and the polymer starts to flow out of the die. The temperature at this time is defined as outflow onset temperature.

<Measurement of Melting Behavior of PHA: Measurement of Thermal Nature with Differential Scanning Calorimeter (DSC)>

The melting behavior of PHA was measured using a differential scanning calorimeter (Rigaku, Thermo plus EVO DSC8230). The measurement atmosphere was nitrogen (30 ml/min), and the temperature was raised from 30° C. to a range from 130 to 260° C. (appropriately selected depending on the type and melting point of PHA) at 20° C./min. The amount of the sample was approximately 1 mg, and an aluminum sample pan was used. Indium was used for temperature calibration.

When the melting peak was sharp, in accordance with JIS-K7121, the extrapolated melting offset temperature of the melting peak was a temperature at an intersection between a tangent line drawn at a point of maximum slope before peak end and a baseline after the peak (recognized by Thermo plus EVO software, Rigaku). When a plurality of melting peak shapes overlapped, the tangent line was redrawn manually for the peak on a higher temperature side, and a point of intersection with the baseline was set as the extrapolated melting offset temperature.

The glass transition temperature (Tg) of each sample was measured using a differential scanning calorimeter (DSC) model: DSC 8500 (PerkinElme, USA) attached with an intracooler under a nitrogen atmosphere (20 mL/min). At the $1^{st}$ run, the temperature was raised from 50° C. to 200° C. at a temperature raising rate of 10° C./min, and the sample was melted by an isothermal treatment for 1 minute at 200° C. Thereafter, the sample was quenched to −50° C. at 200° C./min, and subjected to an isothermal treatment for 1 minute at −50° C.; the temperature was then raised from −50° C. to 20° C. at 10° C./min; and the $T_g$ was measured at the $2^{nd}$ run. A sample pan made of aluminum was used. Indium was used for temperature calibration.

<Partial Melt Extrusion and Melt Extrusion of PHA: Melt Spinning at Constant Temperature Using Flow Tester>

Melt extrusion spinning was performed using a flow tester CFT-500D (available from Shimadzu Corporation) or CFT-500EX available from Shimadzu Corporation).

<Comparative Example 1> P(3HB) Powder, No Heat Treatment, Sample S1

Figure 1:
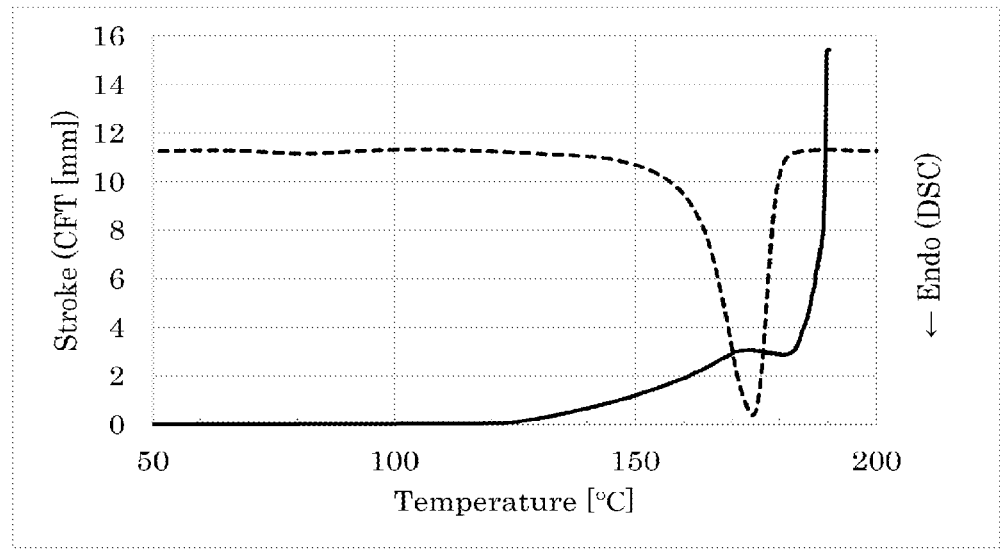
FIG. 1 shows a flow curve (solid line) and a DSC curve (dashed line), according to a flow tester temperature raising method, of Sample S1 (P(3HB) homopolymer).

Water-based purified P(3HB) powder was used as Sample S1. The Mw of Sample S1 was 940000. Sample S1 was analyzed by CFT (Capillary Flowtester) and DSC. The CFT outflow onset temperature was 181.0° C., and the width of the crystal melting peak by DSC was approximately from 140 to 189° C. The crystal melting peak apex was 175.0° C., the DSC extrapolated melting offset temperature was 179.5° C., and the temperature at which the melting point peak reached the baseline was 188.7° C. It was found that the DSC extrapolated melting offset temperature was lower than the CFT outflow onset temperature, and that the polymer did not flow out unless in a completely melted state. FIG. 1 shows measurement results of CFT and DSC.

The temperature at which the melting point peak reached the baseline was higher than the CFT outflow onset temperature, and, when paying attention to this fact, it can be considered, in view of the measurement value, it is possible that Sample S1 is partially melted. However, the melting state of a polymer can be affected not only by the temperature, but also by another factor such as the time during which the polymer is being heated, and, when the pressure at the time of melt extrusion is high, the polymer is easily partially melt extruded. From such considerations, temperatures ranging from the CFT outflow onset temperature to the DSC extrapolated melting offset temperature are shown as partial melt extrusion enabling temperatures in the tables.

<Example 1> P(3HB) Powder, Water Bath Heat Treatment at 70° C., Sample S2

Figure 2:
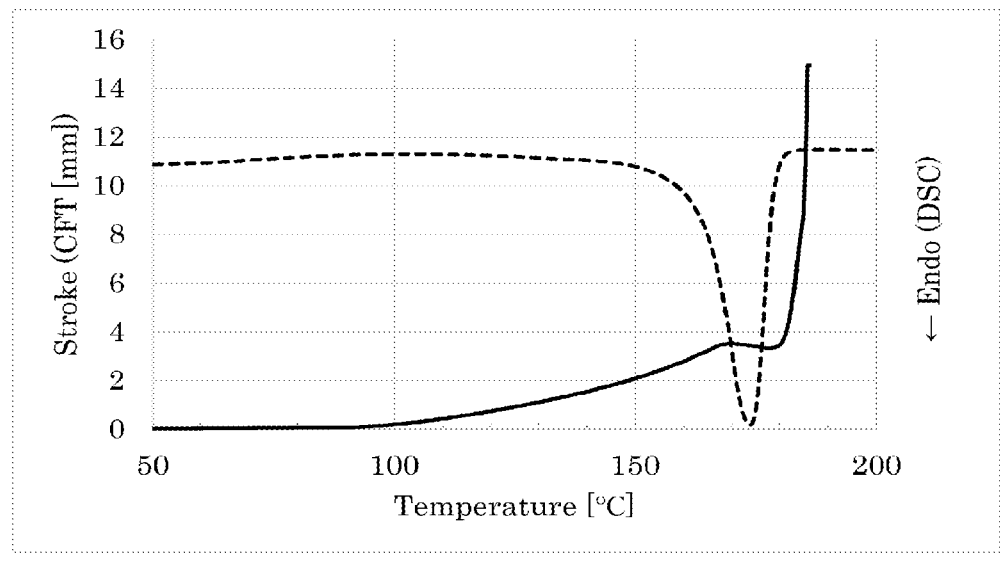
FIG. 2 shows a flow curve (solid line) and a DSC curve (dashed line), according to a flow tester temperature raising method, of Sample S2 (P(3HB) homopolymer).

The water-based purified P(3HB) powder as Sample S1 was immersed in water and subjected to a warm bath treatment at 70° C. for 24 hours, and then dried in vacuo to obtain Sample S2. The Mw of Sample S2 was 940000. Sample S2 was analyzed by CFT and DSC. The CFT outflow onset temperature was 178.6° C., and the width of the crystal melting peak by DSC was approximately from 140 to 188° C. The crystal melting peak apex was 175.1° C., the DSC extrapolated melting offset temperature was 182.0° C., and the temperature at which the melting point peak reached the baseline was 188.0° C. The DSC extrapolated melting offset temperature was higher than the CFT outflow onset temperature, and the sample could flow out in a partially melted state. However, the CFT outflow onset temperature and the DSC extrapolated melting offset temperature were in almost the same temperature range (temperature difference: 3.4° C.), and strict temperature control is considered to be required for molding it in a substantially partially melted state. FIG. 2 shows measurement results of CFT and DSC.

<Example 2> P(3HB) powder, dry heat treatment at 70° C., Sample S3

Figure 3:
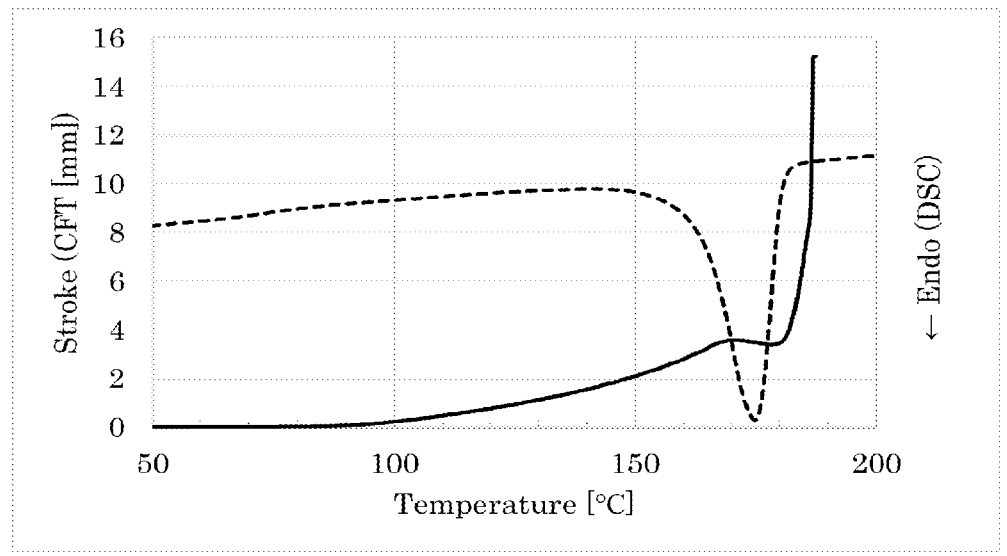
FIG. 3 shows a flow curve (solid line) and a DSC curve (dashed line), according to a flow tester temperature raising method, of Sample S3 (P(3HB) homopolymer).

The water-based purified P(3HB) powder as Sample S1 was subjected to a dry heat treatment at 70° C. in a dry heat oven for 24 hours, and the temperature was then returned to room temperature to obtain Sample S3. The Mw of Sample S3 was 940000. The CFT outflow onset temperature was 178.6° C., and the width of the crystal melting peak by DSC was approximately from 140 to 187° C. The crystal melting peak apex was 174.9° C., the DSC extrapolated melting offset temperature was 180.5° C., and the temperature at which the melting point peak reached the baseline was 186.9° C. The DSC extrapolated melting offset temperature was higher than the CFT outflow onset temperature, and the sample could flow out in a partially melted state. However, the CFT outflow onset temperature and the DSC extrapolated melting offset temperature were in almost the same temperature range (temperature difference: 1.9° C.), and strict temperature control is considered to be required for molding it in a substantially partially melted state. FIG. 3 shows measurement results of CFT and DSC.

Figure 4:
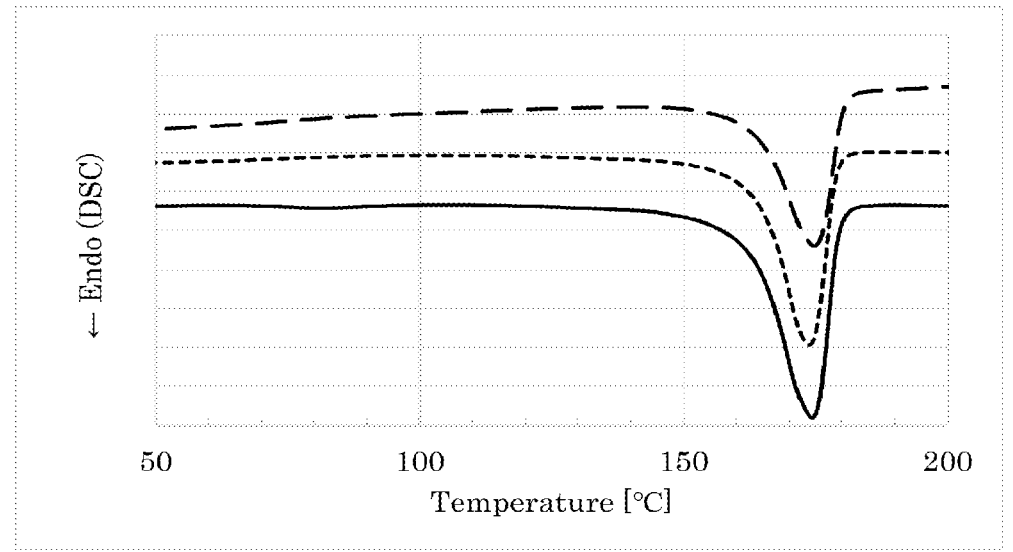
FIG. 4 shows superposition of the DSC curves of Sample S1 (solid line), Sample S2 (dashed line), and Sample S3 (roughly dashed line).

FIG. 4 shows superposition of the DSC curves of Sample S1, Sample S2, and Sample S3 of Comparative Example 1, Example 1, and Example 2, respectively. P(3HB) included a continuous monomer unit chain of highly crystalline (R)-3HB, and had substantially similar DSC curves without the peak top position of the main melting point peak being significantly changed due to the presence or absence of heat treatment like PHA copolymer. By the water bath treatment or dry heat heating treatment of the bulk P(3HB) at 70° C., the CFT outflow onset temperature was shifted to a slightly lower temperature side than 181.0° C. (178.6° C.).

<Example 3> P(3HB-Co-13.1 Mol % 4HB) Powder, Sample S4

Figure 5:
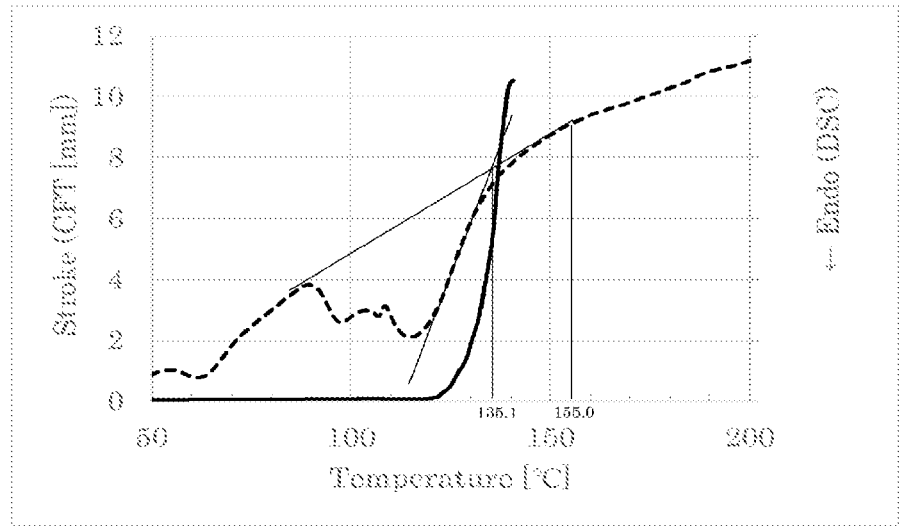
FIG. 5 shows a flow curve (solid line) and a DSC curve (dashed line), according to the flow tester temperature

Water-based purified P(3HB-co-13.1 mol % 4HB) through a water-based reaction at 70° C. for 35 hours was used as Sample S4. The Mw of Sample S4 was 1 million, and the glass transition temperature (Tg) was approximately −4° C. Sample S4 was analyzed by CFT and DSC. The CFT outflow onset temperature was 125.1° C., and the width of the crystal melting peak by DSC was approximately from 49 to 157° C. The crystal melting peak apexes were 63.7° C. and 114.8° C., the DSC extrapolated melting offset temperature was 135.1° C., and the temperature at which the melting point peak reached the baseline was 155.0° C. It has been found that the DSC extrapolated melting offset temperature was higher than the CFT outflow onset temperature, and that the polymer could be partially melt extruded in a range of 125.1° C. or higher and lower than 135.1° C. FIG. 5 shows measurement results of CFT and DSC.

Melt spinning was performed at 126° C., 130° C. or 135° C. as a temperature enabling partial melting, or at 150° C., 160° C. or 170° C. as a temperature at which the sample was almost melted.

The Mw before melt spinning was 1 million, whereas the Mw after partial melt spinning at 126° C. was 950000, the Mw after partial melt spinning at 130° C. was 970000, the Mw after partial melt spinning at 135° C. was 970000, the Mw after melt spinning at 150° C. was 820000, the Mw after melt spinning at 160° C. was 6500(0), and the Mw after melt spinning at 170° C. was 540000. When the molecular weight Mw of 1 million before melt spinning was defined as 100%, the residual ratio of the molecular weight Mw after melt spinning at each temperature was 95% at 126° C., 97% at 130° C., 97% at 135° C., 91% at 140° C., 82% at 150° C., and 65% at 160° C. On the other hand, the residual ratio was 53% at 170° C. These results revealed that ability to spin at a lower temperature was effective in suppressing the reduction in molecular weight. Especially, in the partial melt spinning at 135° C. or lower where the polymer was not in a completely melted state, the reduction in molecular weight was prominently suppressed.

The results are shown in Table 2.

In the melt spinning at 170° C., the tackiness of the extruded polymer was strong, and agglutination was observed. The polymer which had solidified after winding could not be unraveled. On the other hand, almost no tackiness was observed in yarns obtained by partial melt extrusion spinning at 135° C. or lower, and the yarns could be wound and stretched without agglutination immediately after spinning. That is, it was demonstrated that partial melt extrusion spinning could shorten the crystallization time, improve the melt processability of the polymer, and enhance productivity.

<Example 4> P(3HB-Co-13.1 Mol % 4HB) Powder, Sample S5

Sample S4, the water-based purified P(3HB-co-13.1 mol % 4HB) in a dry state, was immersed in water again, subjected to a warm bath treatment at 70° C. for 24 hours, and then dried in vacuo to obtain Sample S5. The Mw of Sample S5 was 1 million. Sample S5 was analyzed by CFT and DSC. The CFT outflow onset temperature was 109.8° C., and the width of the crystal melting peak by DSC was approximately from 88 to 159° C. The crystal melting peak apexes were 95.0° C. and 118.6° C., the DSC extrapolated melting offset temperature was 139.1° C., and the temperature at which the melting point peak reached the baseline was 158.5° C. It has been found that the DSC extrapolated melting offset temperature was higher than the CFT outflow onset temperature, and that the polymer could be partially melt extruded in a range of 109.8° C. or higher and lower than 139.8° C. FIG. 6 shows measurement results of CFT and DSC.

Sample S4 could be partially melt extruded in a range of 125.1° C. or higher and lower than 140.2° C. Sample S5 which had been subjected to the heating treatment in water at 70° C. could be partially melt extruded in a range of 109.8° C. or higher and lower than 139.8° C., and the temperature range where the sample can be partially melt extruded by the heating treatment was expanded by approximately 15° C. toward the low temperature side.

<Example 5> P(3HB-Co-13.1 Mol % 4HB) Powder, Sample S6

Sample S4, the water-based purified P(3HB-co-13.1 mol % 4HB) in a dry state, was subjected to a dry heat treatment at 70° C. in an oven for 24 hours, and the temperature was then returned to room temperature to obtain Sample S6. The Mw of Sample S6 was 1 million. Sample S6 was analyzed by CFT and DSC. The CFT outflow onset temperature was 110.0° C., and the width of the crystal melting peak by DSC was approximately from 75 to 160° C. The crystal melting peak apexes were 81.9° C. and 119.1° C., the DSC extrapolated melting offset temperature was 137.8° C., and the temperature at which the melting point peak reached the baseline was 158.8° C. It has been found that the DSC extrapolated melting offset temperature was higher than the CFT outflow onset temperature, and that the polymer could be partially melt extruded in a range of 10.0° C. or higher and lower than 137.8° C. FIG. 7 shows measurement results of CFT and DSC.

FIG. 8 shows superposition of the DSC curves of Sample S4, Sample S5, and Sample S6 of Example 3, Example 4, and Example 5, respectively. Furthermore, after Sample S4 was dissolved in chloroform, a cast film was prepared, and the DSC curve of a film (Sample S7) aged at room temperature for 1 week or longer was also illustrated. Unlike the DSC curves of P(3HB) shown in FIG. 4, the DSC curves of the P(3HB-co-4HB) copolymers greatly varied in the peak shape during melting depending on the way to give the thermal history, dissolution in the solvent, and solvent evaporation.

Sample S4 could be partially melt extruded in a range of 125.1° C. or higher and lower than 140.2° C. However, Sample S5 which had been subjected to the heating treatment in water at 70° C. could be partially melt extruded in a range of 109.8° C. or higher and lower than 139.8° C., and Sample S6 which had been subjected to the dry heat treatment at 70° C. could be partially melt extruded in a range of 110.0° C. or higher and lower than 139.1° C. The temperature range where the sample could be partially melt extruded by the heating treatment was expanded by approximately 15° C. toward the low temperature side.

<Comparative Example 2> Sample S8, Solvent Extraction, No Heat Treatment

P(31HB-co-61.5 mol % 3HV) purified by solvent extraction precipitation (chloroform extraction-hexane precipitation system) was used as Sample S5. The Mw of Sample S8 was 730000, and the glass transition temperature (Tg) was approximately −11° C. Sample S8 was analyzed by CFT and DSC. The CFT outflow onset temperature was 84.5° C., and the width of the crystal melting peak by DSC was approximately from 56 to 179° C. The crystal melting peak apex was 90.5° C., and there was an apex of a small melting peak that would be derived from the 3HB-rich crystals also at 166.3° C. The DSC extrapolated melting offset temperature of the main melting peak was 97.5° C.: the DSC extrapolated melting offset temperature of the melting peak on a high temperature side was 173.2° C.; and the temperature at which the melting point peak reached the baseline was 178.5° C. It has been found that the DSC extrapolated melting offset temperature was higher than the CFT outflow onset temperature, and that the polymer could be partially melt extruded in a range of 84.5° C. or higher and lower than 173.2° C. It can be seen that, even assuming that the component which appeared as the small melting peak on the high temperature side and would be attributed to 3HB-rich crystals was absent, the extrapolated melting offset temperature of the melting peak on a low temperature side was 97.5° C., and, in this case, partial melt extrusion could be performed in a range of 84.5° C. or higher and lower than 97.5° C. FIG. 9 shows measurement results of CFT and DSC.

<Example 6> Sample S9, Solvent Extraction, Heat Treatment in Water at 70° C.

Sample S8, P(3HB-co-61.5 mol % 3HV) purified by solvent extraction precipitation, was immersed in water, subjected to a warm bath treatment at 70° C. for 24 hours, and then dried in vacuo to obtain Sample S9. The Mw of Sample S9 was 720000. Sample S9 was analyzed by CFT and DSC. The CFT outflow onset temperature was 80.8° C., and the width of the crystal melting peak by DSC was approximately from 49 to 178° C. The crystal melting peak apex was 90.7° C., and there was an apex of a small melting peak that would be derived from the 3HB-rich crystals also at 165.6° C. The DSC extrapolated melting offset temperature of the main melting peak was 96.9° C.; the DSC extrapolated melting offset temperature of the melting peak on a high temperature side was 172.6° C.; and the temperature at which the melting point peak reached the baseline was 176.2° C. It has been found that the DSC extrapolated melting offset temperature was higher than the CFT outflow onset temperature, and that the polymer could be partially melt extruded in a range of 80.8° C. or higher and lower than 172.6° C. It can be seen that, even assuming that the component which appeared as the small melting peak on the high temperature side and would be attributed to 3HB-rich crystals was absent, the extrapolated melting offset temperature of the melting peak on a low temperature side was 96.9° C., and, in this case, partial melt extrusion could be performed in a range of 80.8° C. or higher and lower than 96.9° C. FIG. 10 shows measurement results of CFT and DSC.

<Example 7> Sample S10, Solvent Extraction, Dry Heat Treatment at 70° C.

Sample S8, P(3HB-co-61.5 mol % 3HV) purified by solvent extraction precipitation, was again subjected to a dry heat treatment at 70° C. in the oven for 24 hours, and the temperature was then returned to room temperature to obtain Sample S10. The Mw of Sample S10 was 730000. Sample S10 was analyzed by CFT and DSC. The CFT outflow onset temperature was 79.8° C., and the width of the crystal melting peak by DSC was approximately from 75 to 178° C. The crystal melting peak apex was 88.9° C., and there was an apex of a small melting peak that would be derived from the 3HB-rich crystals also at 167.0° C. The DSC extrapolated melting offset temperature of the main melting peak was 97.5° C.; the DSC extrapolated melting offset temperature of the melting peak on a high temperature side was 173.3° C.; and the temperature at which the melting point peak reached the baseline was 177.3° C. It has been found that the DSC extrapolated melting offset temperature was higher than the CFT outflow onset temperature, and that the polymer could be partially melt extruded in a range of 79.8° C. or higher and lower than 173.3° C. It can be seen that, even assuming that the component which appeared as the small melting peak on the high temperature side and would be attributed to 3HB-rich crystals was absent, the extrapolated melting offset temperature of the melting peak on a low temperature side was 97.5° C., and, in this case, partial melt extrusion could be performed in a range of 79.8° C. or higher and lower than 97.5° C. FIG. 11 shows measurement results of CFT and DSC.

FIG. 12 shows superposition of the DSC curves of Sample S8, Sample S9, and Sample S10 of Comparative Example 2, Example 6, and Example 7, respectively. Unlike the DSC curves of P(3HB) illustrated in FIG. 4, the DSC curves of the P(3HB-co-3HV) copolymers greatly varied in peak shape during melting depending on the way to give the thermal history.

Sample S8 could be partially melt extruded in a range of 84.5° C. or higher and lower than 173.2° C. However, Sample S9 which had been subjected to the heating treatment in water at 70° C. could be partially melt extruded in a range of 80.8° C. or higher and lower than 172.6° C., and Sample S10 which had been subjected to the dry heat treatment at 70° C. could be partially melt extruded in a range of 79.8° C. or higher and lower than 173.3° C. The temperature range where the sample could be partially melt extruded by the heating treatment was expanded by approximately 5° C. toward the low temperature side.

EXAMPLES

Water-based purified P(3HB-co-16.0 mol % 4HB) powder having a Mw of 620000 and a glass transition temperature (Tg) of approximately −5° C. was used as Sample S11. Sample S11 was subjected to a dry heat treatment at 70° C. in air for 24 hours, a treatment at 50° C. in water for 24 hours, a treatment at 60° C. in water for 24 hours, a treatment at 70° C. in water for 24 hours, or a treatment at 80° C. hours in water, and the PHAs subjected to the heat treatment in water were lyophilized, to yield dry bodies. The respective heat treated samples were evaluated by DSC, and DSC curves (thermograms) of their temperature rise first cycles are shown together in FIG. 13.

Further, the same Sample S11 was subjected to a treatment at 50'C in water for 24 hours, a treatment at 50° C. in methanol for 12 hours, a treatment at 50° C. in ethanol for 12 hours, or a treatment at 50° C. in hexane for 12 hours, and then dried in vacuo to yield dry bodies. The respective heat treated samples were evaluated by DSC, and DSC curves (thermograms) of their temperature rise first cycles are shown together in FIG. 14.

Melt peak shapes according to various heat treatments were exhibited by various heat treatments. It is known that the DSC melting peak temperature depends on the thicknesses of the lamellar crystals in a crystalline polymer. Among PHAs, P(3HB) exhibited no significant change in DSC main melting peak position in the heat treatment in water or dry heat treatment at 70° C. as shown in FIG. 4, but P(3HB-co-4HB) exhibited major melting peak shapes depending on the treatment temperature in water, solvent, or air as shown in FIG. 13 and FIG. 14. The phenomenon of the peak shape changes by heat treatment was observed also in the P(3HB-co-3HV) copolymers (FIG. 12); heating treatment in a temperature range which was equal to or higher than the glass transition temperature of the PHA and in which the PHA itself did not undergo melting caused rearrangement of the lamellar crystals, and thus the thicknesses of the lamellar crystals could be controlled. This is a technique linked to control of melt processability and is useful as a pretreatment for advantageously advancing partial melt-molding.

melt-molding a polyhydroxyalkanoate yielded by the heating treatment, wherein the polyhydroxyalkanoate comprises lamellar crystals that are different in lamellar thickness, in a temperature range where some of the lamellar crystals undergo melting and flowing, and the other balance lamellar crystals remain unmelted, and

TABLE 1

| | Sample No. | Example Comparative Example | Composition | CFT outflow onset temperature [° C.] | Extrapolated melting offset temperature of DSC 1st heating peaks [° C.] | Baseline arrival temperature of DSC 1st heating peaks [° C.] | Whether partial melt extrusion is possible or not | Partial melt extrusion enabling temperature [° C.] | Post-purification heat treatment | Extraction method |
|---|---|---|---|---|---|---|---|---|---|---|
| FIG. 1 | S1 | Comparative Example 1 | 3HB 100 mol % | 181.0 | 179.5 | 188.7 | Not possible | — | None | Water-based |
| FIG. 2 | S2 | Example 1 | 3HB 100 mol % | 178.6 | 179.2 | 188.0 | Possible | 178.6 to 179.2 | W70 | |
| FIG. 3 | S3 | Example 2 | 3HB 100 mol % | 178.6 | 180.5 | 186.9 | Possible | 178.6 to 180.5 | D70 | |
| FIG. 5 | S4 | Example 3 | 4HB 13.1 mol % | 125.1 | 135.1 | 156.6 | Possible | 125.1 to 135.1 | None | Water-based |
| FIG. 6 | S5 | Example 4 | 4HB 13.1 mol % | 109.8 | 139.1 | 158.5 | Possible | 109.8 to 139.1 | W70 | |
| FIG. 7 | S6 | Example 5 | 4HB 13.1 mol % | 110.0 | 137.8 | 158.8 | Possible | 110.0 to 137.8 | D70 | |
| FIG. 9 | S8 | Comparative Example 2 | 3HV 61.5 mol % | 84.5 | 97.5, 173.2 | 178.5 | Possible | 84.5 to 173.2 | None | Solvent-based |
| FIG. 10 | S9 | Example 6 | 3HV 61.5 mol % | 80.8 | 96.9, 172.6 | 176.2 | Possible | 80.8 to 172.6 | W70 | |
| FIG. 11 | S10 | Example 7 | 3HV 61.5 mol % | 79.8 | 97.5, 173.3 | 177.3 | Possible | 79.8 to 173.3 | D70 | |

W70 denotes heat treatment at 70° C. in water for 24 hours after purification.
D70 denotes dry heat treatment at 70° C. for 24 hours after purification.

TABLE 2

Melted states before and after melt extrusion and change in molecular weight Mw after melt extrusion at each temperature of Sample S4 (P(3HB-co-13.1 mol % 4HB))

| Sample No. | Example Comparative Example | Partially-melt extrudable temperature [° C.] | Melt extrusion temperature [° C.] | Melted state | Mw before and after melt extrusion | Mw residual rate[*3] [%] |
|---|---|---|---|---|---|---|
| S4 | | 125.1 to 135.1 | Unmelted | Unmelted | 1.00 million[*1] | 100 |
| S4 | Examples | 125.1 to 135.1 | 126.0 | Partially melted | 950000[*2] | 95 |
| S4 | Examples | 125.1 to 135.1 | 130.0 | Partially melted | 970000[*2] | 97 |
| S4 | Examples | 125.1 to 135.1 | 135.0 | Partially melted | 970000[*2] | 97 |
| S4 | Comparative Examples | 125.1 to 135.1 | 150.0 | Melted | 820000[*2] | 82 |
| S4 | Comparative Examples | 125.1 to 135.1 | 160.0 | Melted | 650000[*2] | 65 |
| S4 | Comparative Examples | 125.1 to 135.1 | 170.0 | Melted | 540000[*2] | 53 |

[*1]Mw before melt extrusion
[*2]Mw after melt extrusion
[*3]Mw residual ratio: [weight average molecular weight (Mw) after melt extrusion ÷ weight average molecular weight (Mw) before melt extrusion] × 100

The invention claimed is:

1. A method for producing a polymeric molded product, the method comprising:

subjecting a crystalline polyhydroxyalkanoate to a heating treatment at a temperature equal to or higher than a glass transition temperature; and wherein the temperature range is 109.8° C. to 139.1° C., which is a range which is higher than an outflow onset temperature determined in accordance with a flow tester temperature raising method and lower than an extrapolated melting offset temperature.

2. The method according to claim 1, wherein the heating treatment is a heating treatment mediated by a gas, a liquid or a solid.

3. The method according to claim 1, wherein the heating treatment is a heating treatment mediated by a liquid, and the polyhydroxyalkanoate is not completely dissolved in the liquid in a heated state.

4. The method according to claim 1, further comprising cooling the melted polymer in air, in a temperature range where some of the lamellar crystals undergo melting and flowing, and the other balance lamellar crystals remain unmelted.

5. The method according to claim 1, wherein heat molding is molding through melt extrusion.

6. The method according to claim 1, wherein the heat molding is molding through melt extrusion spinning.

7. The method according to claim 1, wherein the crystalline polyhydroxyalkanoate is a copolymer comprising 3-hydroxybutyric acid and 4-hydroxybutyric acid as monomer units.

8. The method according to claim 1, wherein the crystalline polyhydroxyalkanoate is a copolymer comprising 3-hydroxybutyric acid and 4-hydroxybutyric acid as monomer units, and a proportion of the 4-hydroxybutyric acid is from 5 mol % to 40 mol %.

* * * * *

26